(12) United States Patent
Stephenson et al.

(10) Patent No.: US 7,426,961 B2
(45) Date of Patent: Sep. 23, 2008

(54) METHOD OF TREATING SUBTERRANEAN FORMATIONS WITH POROUS PARTICULATE MATERIALS

(75) Inventors: Christopher John Stephenson, Houston, TX (US); Allan Ray Rickards, Tomball, TX (US); Harold Dean Brannon, Magnolia, TX (US); D. V. Satyanarayana Gupta, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 403 days.

(21) Appl. No.: 10/653,521

(22) Filed: Sep. 2, 2003

(65) Prior Publication Data
US 2004/0040708 A1  Mar. 4, 2004

Related U.S. Application Data

(60) Provisional application No. 60/428,836, filed on Nov. 25, 2002, provisional application No. 60/407,734, filed on Sep. 3, 2002.

(51) Int. Cl.
*E21B 43/267* (2006.01)
*E21B 43/02* (2006.01)
(52) U.S. Cl. .................. 166/280.2; 166/276; 166/308.2
(58) Field of Classification Search .................. 166/295, 166/308.1, 280.1, 280.2, 305.1, 300, 276, 166/278, 281; 507/924, 269
See application file for complete search history.

(56) References Cited

U.S. PATENT DOCUMENTS

| | | | |
|---|---|---|---|
| 3,089,542 A | 5/1963 | Kolodny | |
| 3,149,673 A | 9/1964 | Pennington | |
| 3,149,674 A * | 9/1964 | Pennington et al. | 166/280.1 |
| 3,335,796 A | 8/1967 | Parker, Jr. | |
| 3,492,147 A | 1/1970 | Young | |
| 3,659,651 A | 5/1972 | Graham | |
| 3,888,311 A | 6/1975 | Cooke | |
| 3,929,191 A | 12/1975 | Graham et al. | |
| 4,078,610 A * | 3/1978 | Arnold | 166/280.1 |

(Continued)

FOREIGN PATENT DOCUMENTS

CA 2329834 A1 6/2002

(Continued)

OTHER PUBLICATIONS

Glazing Ceramic Tile, www.artistictile.net/pages/Info/Info_glazing.html.

(Continued)

*Primary Examiner*—Zakiya W. Bates
(74) *Attorney, Agent, or Firm*—Jones & Smith, LLP; John Wilson Jones

(57) ABSTRACT

Methods and compositions useful for subterranean formation treatments, such as hydraulic fracturing treatments and sand control that include porous materials. Such porous materials may be selectively configured porous material particles manufactured and/or treated with selected glazing materials, coating materials and/or penetrating materials to have desired strength and/or apparent density to fit particular downhole conditions for well treating such as hydraulic fracturing treatments and sand control treatments. Porous materials may also be employed in selected combinations to optimize fracture or sand control performance, and/or may be employed as relatively lightweight materials in liquid carbon dioxide-based well treatment systems.

85 Claims, 17 Drawing Sheets

U.S. PATENT DOCUMENTS

| | | | |
|---|---|---|---|
| 4,439,489 A | 3/1984 | Johnson et al. | |
| 4,462,466 A | 7/1984 | Kachnik | |
| 4,493,875 A | 1/1985 | Beck | |
| 4,547,468 A | 10/1985 | Jones et al. | |
| 4,585,064 A | 4/1986 | Graham et al. | |
| 4,632,876 A | 12/1986 | Laird et al. | |
| 4,654,266 A | 3/1987 | Kachnik | |
| 4,680,230 A | 7/1987 | Gibb et al. | |
| 4,717,594 A | 1/1988 | Graham et al. | |
| 4,733,729 A | 3/1988 | Copeland | |
| 4,796,701 A | 1/1989 | Hudson et al. | |
| 4,850,430 A | 7/1989 | Copeland et al. | |
| 4,869,960 A | 9/1989 | Gibb et al. | |
| 4,875,525 A | 10/1989 | Manna | |
| 4,888,240 A | 12/1989 | Graham et al. | |
| 4,921,820 A | 5/1990 | Rumpf et al. | |
| 4,923,714 A * | 5/1990 | Gibb et al. | 427/221 |
| 5,175,133 A | 12/1992 | Smith et al. | |
| 5,240,654 A | 8/1993 | Smith et al. | |
| 5,422,183 A | 6/1995 | Sinclair et al. | |
| 5,492,178 A | 2/1996 | Nguyen | |
| 5,531,274 A | 7/1996 | Bienvenu, Jr. | |
| 5,547,506 A | 8/1996 | Rae et al. | |
| 5,582,249 A | 12/1996 | Caveny et al. | |
| 5,582,250 A | 12/1996 | Constien | |
| 5,597,784 A | 1/1997 | Sinclair et al. | |
| 5,604,184 A | 2/1997 | Ellis et al. | |
| 5,699,860 A | 12/1997 | Grundmann | |
| 5,799,734 A | 9/1998 | Norman et al. | |
| 5,837,656 A | 11/1998 | Sinclair | |
| 5,924,488 A | 7/1999 | Nguyen et al. | |
| 5,948,734 A | 9/1999 | Sinclair | |
| 5,950,727 A * | 9/1999 | Irani | 166/270 |
| 5,955,144 A | 9/1999 | Sinclair et al. | |
| 5,960,878 A * | 10/1999 | Nguyen et al. | 166/276 |
| 5,964,291 A * | 10/1999 | Bourne et al. | 166/279 |
| 6,047,772 A | 4/2000 | Weaver et al. | |
| 6,059,034 A | 5/2000 | Rickards et al. | |
| 6,079,492 A | 6/2000 | Hoogteerjling et al. | |
| 6,114,410 A | 9/2000 | Betzold | |
| 6,169,058 B1 | 1/2001 | Le et al. | |
| 6,194,355 B1 | 2/2001 | Jarrett et al. | |
| 6,211,120 B1 | 4/2001 | Welch et al. | |
| 6,311,773 B1 * | 11/2001 | Todd et al. | 166/280.2 |
| 6,328,105 B1 | 12/2001 | Betzold | |
| 6,330,916 B1 | 12/2001 | Rickards et al. | |
| 6,364,018 B1 * | 4/2002 | Brannon et al. | 166/280.2 |
| 6,372,678 B1 * | 4/2002 | Youngman et al. | 501/128 |
| 6,406,789 B1 | 6/2002 | McDaniel et al. | |
| 6,439,309 B1 | 8/2002 | Matherly et al. | |
| 6,439,310 B1 | 8/2002 | Scott, III et al. | |
| 6,503,676 B2 | 1/2003 | Yamashita et al. | |
| 6,508,305 B1 | 1/2003 | Brannon et al. | |
| 6,528,157 B1 | 3/2003 | McDaniel et al. | |
| 6,582,819 B2 | 6/2003 | McDaniel et al. | |
| 6,632,527 B1 | 10/2003 | McDaniel | |
| 6,667,261 B1 | 12/2003 | Anshita et al. | |
| 6,668,926 B2 | 12/2003 | Nguyen et al. | |
| 6,705,400 B1 | 3/2004 | Nguyen et al. | |
| 6,725,931 B2 | 4/2004 | Nguyen et al. | |
| 6,729,404 B2 | 5/2004 | Nguyen et al. | |
| 6,742,590 B1 | 6/2004 | Nguyen | |
| 6,749,025 B1 | 6/2004 | Brannon et al. | |
| 6,766,817 B2 | 7/2004 | da Silva | |
| 6,772,838 B2 | 8/2004 | Dawson et al. | |
| 6,830,105 B2 | 12/2004 | Theising et al. | |
| 6,892,813 B2 | 5/2005 | Nguyen et al. | |
| 6,945,329 B2 | 9/2005 | Harris et al. | |
| 7,036,591 B2 | 5/2006 | Cannan et al. | |
| 7,044,220 B2 | 5/2006 | Nguyen et al. | |
| 2003/0050432 A1 * | 3/2003 | Ramesh et al. | 528/354 |
| 2003/0083206 A1 | 5/2003 | Masikewich et al. | |
| 2003/0102128 A1 | 6/2003 | Dawson et al. | |
| 2003/0224165 A1 | 12/2003 | Anderson et al. | |
| 2004/0023812 A1 | 2/2004 | England et al. | |
| 2004/0023818 A1 | 2/2004 | Nguyen et al. | |
| 2004/0149441 A1 | 8/2004 | Nguyen et al. | |
| 2004/0224165 A1 | 11/2004 | Barron et al. | |
| 2005/0006095 A1 | 1/2005 | Justus et al. | |
| 2005/0011648 A1 | 1/2005 | Nguyen | |
| 2005/0019574 A1 | 1/2005 | McCrary | |
| 2005/0022991 A1 | 2/2005 | Rao | |
| 2005/0028976 A1 | 2/2005 | Nguyen et al. | |
| 2005/0130848 A1 | 6/2005 | Todd et al. | |
| 2005/0257929 A1 | 11/2005 | Nguyen et al. | |
| 2006/0127363 A1 | 6/2006 | Gunner et al. | |

FOREIGN PATENT DOCUMENTS

| | | | |
|---|---|---|---|
| EP | 0308257 | A2 | 3/1989 |
| GB | 2319796 | B | 3/1998 |
| GB | 2360534 | A | 9/2001 |
| WO | WO 9954592 | A1 * | 10/1999 |
| WO | WO 01/66908 | A2 | 9/2001 |
| WO | WO 02/26656 | A1 | 4/2002 |

OTHER PUBLICATIONS

Faster Firing Frits—Borax think tank to track and facilitate change in world ceramic industry; Pioneer Magazine, Jan. 1997.

Mixing and Using Glazes; www.mm.com/mnclayus/glaze.html.

SPE 40016; The History and Success of Liquid CO2 and CO2/N2 Fracturing System; D.V.S. Gupta, SPE, and D.M. Bobier, SPE (1998).

"Arl Imports Inc. Welcomes you to Czech-Mate;" ARI Imports, Inc.; http://www.czechmate.com/main_002.htm, undated.

"Here are the Beads;" Beadreaming; http://www.beadreaming.com, undated.

Beads Galore International Inc.; http://beadsgalore.com/index.thml, undated.

"The Toast of the Bead World;" Beads Unlimited aka The Brighton Bead Shop; http://www.beadsunlimited.co.uk/, undated.

"Distributors & Wholesalers of High Quality Beads & Beading Supplies;" Caravan Beads; http://www.caravanbeads.net/index.html, undated.

Coy; http://www.coysdelight.com, undated.

Sara Creekmore Glass, Inc.; http://www.creekmore-glass.com, undated.

"The Dunitz Collection, Beading At Its Best;" Dunitz & Company; http://www.dunitz.com/collection.php, undated.

"Welcome to the World of Earthstone—a Professional Jewelry Designer's Treasury;" Earthstone Company; http://www.earthstone.com, undated.

"The True & Ultlmate Heavenly Paradise;" Empyrean Beads; http://www.empyreanbeads.com, undated.

"The Original Garden of Beadin' a Happy Place to Bead;" The Garden of Beadin' ; http://www.gardenofbeadin.com, undated.

"imagine it. create it. love it!;" HHH Enterprises; http://estore.hhhenterprises.com, undated.

"Wholesale Beads & Findings;" Halstead Bead Inc.; http://www.halstead.com, undated.

Har-Man Importing Corp.; http://www.harmanbeads.com, undated.

"Evil Eye and Ethnic Jewelry;" Karum; http://karumtrading.com, undated.

"Jewelry Findings, Display Aids, Custom Stampings;" Lorac/Union Tool Company; http://loracunion.com, undated.

"Welcome to ModeBeads.com, Your Direct Importers of Czech Glass Beads;" Mode International Inc.; http://modebeads.com, undated.

"Wholesale Beads and More;"The Mykonos; http://mykonosbeads.com, undated.

"Equisite Sterling Silver Beads and Clasps;" Nina Designs; http://www.ninadesigns.com, undated.

"Welcome to Dancing Sun Crystals;" Tarnov Company; http://crystalprism.com, undated.

"Virtually everything you'll need to powwow!;" The Wandering Bull, Inc.; http://wanderingbull.com, undated.

McIninch, et al; New Relationship Between Oil Company and Service Company Rejuvenates a Mature north Sea Gas Field ; SPE 78327; 2002; Society of Petroleum Engineers, Inc.

Norris, et al; Hydraulic Fracturing for Reservoir Management Production Enhancement, Scale Control and Asphaltine Prevention; SPE 71655; 2001; Society of Petroleum Engineers, Inc.

Norris, et al; Maintaining Fracture Performance Through Active Scale Control; SPE 68300; 2001; Society of Petroleum Engineers, Inc.

P.J.C. Webb, et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998; Society of Petroleum Engineers, Inc.

P.J.C. Webb, et al; Economic and Technical Advantages of Revolutionary New Chemical Delivery System for Fractured and Gravel Packed Wells; SPE 38548; 1997; Society of Petroleum Engineers, Inc.

P.J.C. Webb, et al; Revolutionary New Chemical Delivery System for Fractured, Gravel Packed and Prepacked Screen Wells; SPE 38164; 1997; Society of Petroleum Engineers, Inc.

* cited by examiner

METHOD OF TREATING SUBTERRANEAN FORMATIONS WITH POROUS PARTICULATE MATERIALS

SPECIFICATION

This application claims priority to provisional application serial No. 60/407,734, filed on Sep. 3, 2002 and provisional application Ser. No. 60/428,836, filed on Nov. 25, 2002.

FIELD OF THE INVENTION

This invention relates generally to methods and compositions useful for subterranean formation treatments, such as hydraulic fracturing treatments and sand control.

BACKGROUND OF THE INVENTION

Hydraulic fracturing is a common stimulation technique used to enhance production of fluids from subterranean formations. In a typical hydraulic fracturing treatment, fracturing treatment fluid containing a solid proppant material is injected into the formation at a pressure sufficiently high enough to cause the formation or enlargement of fractures in the reservoir. During a typical fracturing treatment, proppant material is deposited in a fracture, where it remains after the treatment is completed. After deposition, the proppant material serves to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment.

Hydraulic fracturing treatments commonly employ proppant materials that are placed downhole with a gelled carrier fluid such as aqueous-based fluid such as gelled brine. Gelling agents for proppant carrier fluids may provide a source of proppant pack and/or formation damage, and settling of proppant may interfere with proper placement downhole. Formation damage may also be caused by gelled carrier fluids used to place particulates downhole for purposes such as for sand control, such as gravel packs, frac packs, and similar materials. Formulation of gelled carrier fluids usually requires equipment and mixing steps designed for this purpose.

Hydraulic fracturing treatments may also employ proppant materials that are placed downhole with non-aqueous-based fluids, such as liquid $CO_2$ and liquid $CO_2/N_2$ systems. Proppants commonly employed with such non-aqueous-based fluids tend to settle in the system.

Many different materials have been used as proppants including sand, glass beads, walnut hulls, and metal shot. Commonly used proppants today include various sands, resin-coated sands, intermediate strength ceramics, and sintered bauxite; each employed for their ability to cost effectively withstand the respective reservoir closure stress environment. As the relative strength of the various materials increases, so too have the respective particle densities, ranging from 2.65 g/cc for sands to 3.4 g/cc for the sintered bauxite. Unfortunately, increasing particle density leads directly to increasing degree of difficulty with proppant transport and a reduced propped fracture volume for equal amounts of the respective proppant, reducing fracture conductivity. Previous efforts undertaken to employ lower density materials as proppant have generally resulted in failure due to insufficient strength to maintain fracture conductivity at even the lowest of closure stresses (1,000 psi).

Recently, deformable particles have been developed. Such deformable particles for sand flowback control are significantly lighter than conventional proppants, and exhibit high compressive strength Such deformable materials include polystyrene divinylbenzene (PSDVB) deformable beads. Such beads, however, have not been entirely successful primarily due to limitations of the base material. While PSDVB beads offered excellent deformability and elasticity, they lacked the structural integrity to withstand high closure stresses and temperatures.

The first successful path to generate functional deformable particles was the usage of modified ground walnut hulls. Walnut hulls in their natural state have been used as proppants, fluid loss agents and lost circulation materials for many years with greater or lesser degrees of success in each respective task. As a proppant, natural walnut hulls have very limited applicability, because they deform fairly readily upon application of closure stress. This deformation drastically reduces conductivity and limits utility of the natural material to relatively low-closure environments.

Walnut hull based ultra-lightweight (UCW) proppants may be manufactured in a two-step process by using closely sized walnut particles (i.e. 20/30 US mesh), and impregnating them with strong epoxy or other resins. These impregnated walnut hull particles are then coated with phenolic or other resins in a fashion similar to most resin coated proppants (RCP). Such walnut hull based ULW proppants have a bulk density of 0.85 grams/cc and withstand up to 6,000 psi (41.4 MPa) closure stress at 175° F. (79° C.).

Generally speaking, the stronger a proppant, the greater the density. As density increases, so too does the difficulty of placing that particle evenly throughout the created fracture geometry. Excessive settling can often lead to bridging of the proppant in the formation before the desired stimulation is achieved. The lower particle density reduces the fluid velocity required to maintain proppant transport within the fracture, which, in turn, provides for a greater amount of the created fracture area to be propped.

ULW proppants which allow for optimization of fracturing treatment with improved fracture length and well productivity are therefore desired.

SUMMARY OF THE INVENTION

The invention relates to methods for treating subterranean formations by treating a well with a composition containing porous ceramic or organic polymeric particulates. In particular, the compositions introduced into the well are particularly suitable in hydraulic fracturing of a well as well as sand consolidation methods such as gravel packing and frac packing. The porous particulate material may be a selectively configured porous particulate material, as defined herein. Alternatively, the porous particulate material may be a non-selectively configured porous particulate material, as defined herein.

The porous particulate material may be selectively configured with a non-porous penetrating material, coating layer or glazing layer. In a preferred embodiment, the porous particulate material is a selectively configured porous particulate material wherein either (a.) the apparent density or apparent specific gravity of the selectively configured porous particulate material is less than the apparent density or apparent specific gravity of the porous particulate material; (b.) the permeability of the selectively configured porous particulate material is less than the permeability of the porous particulate material; or (c.) the porosity of the selectively configured porous particulate material is less than the porosity of the porous particulate material.

In a preferred embodiment, the penetrating material and/or coating layer and/or glazing layer of the selectively configured porous particulate material is capable of trapping or encapsulating a fluid having an apparent specific gravity less than the apparent specific gravity of the carrier fluid. Further, the coating layer and/or penetrating material and/or glazing material may be a liquid having an apparent specific gravity less than the apparent specific gravity of the matrix of the porous particulate material.

The strength of the selectively configured porous particulate material is typically greater than the strength of the porous particulate material per se. Further, the selectively configured porous material exhibits crush resistance under conditions as high as 10,000 psi closure stress, API RP 56 or API RP 60.

In a preferred mode, the porous particulate composition is a suspension of porous particulates in a carrier fluid. The suspension preferably forms a pack of particulate material that is permeable to fluids produced from the wellbore and substantially prevents or reduces production of formation materials from the formation into the wellbore.

Further, the porous particulate material may exhibit a porosity and permeability such that a fluid may be drawn at least partially into the porous matrix by capillary action. Preferably, the porous particulate material has a porosity and permeability such that a penetrating material may be drawn at least partially into the porous matrix of the porous particulate material using a vacuum and/or may be forced at least partially into the porous matrix under pressure.

The selectively configured porous particulate material may consist of a multitude of coated particulates bonded together. In such manner, the porous material is a cluster of particulates coated with a coating or penetrating layer or glazing layer. Suitable coating layers or penetrating materials include liquid and/or curable resins, plastics, cements, sealants, or binders such as a phenol, phenol formaldehyde, melamine formaldehyde, urethane, epoxy resin, nylon, polyethylene, polystyrene or a combination thereof. In a preferred mode, the coating layer or penetrating material is an ethyl carbamate-based resin.

In a preferred embodiment, the selectively configured porous particulate materials are derived from lightweight and/or substantially neutrally buoyant particles. The application of selected porous material particulates and relatively lightweight and/or substantially neutrally buoyant particulate material as a fracture proppant particulate advantageously provides for substantially improved overall system performance in hydraulic fracturing applications, or in other well treating applications such as sand control.

The porous particulate material-containing compositions used in the invention may further contain a carrier fluid. The carrier fluid may be a completion or workover brine, salt water, fresh water, a liquid hydrocarbon, or a gas such as nitrogen or carbon dioxide.

The porous particulate material-containing compositions may further contain a gelling agent, crosslinking agent, gel breaker, surfactant, foaming agent, demulsifier, buffer, clay stabilizer, acid or a mixture thereof.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
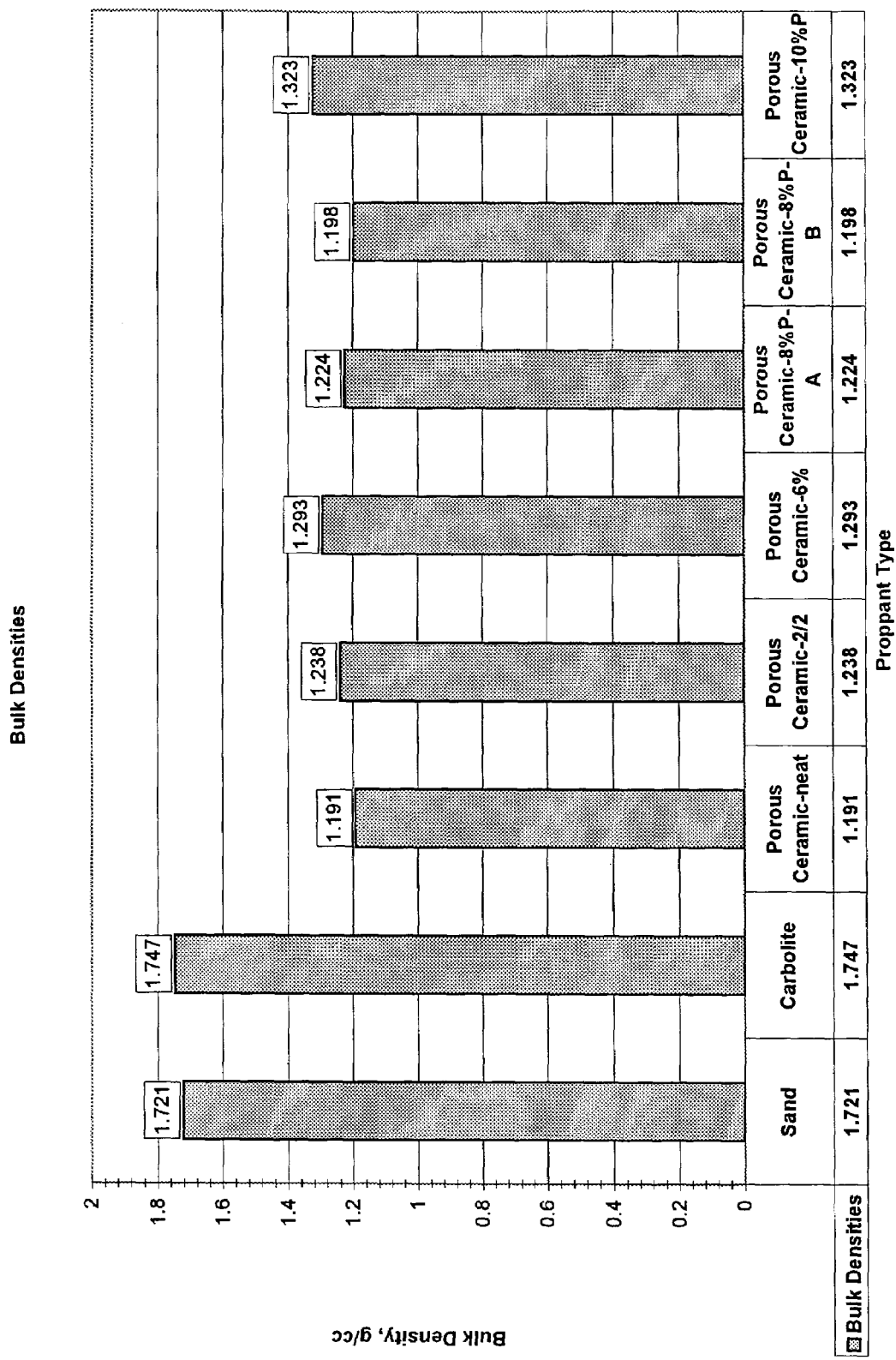
FIG. 1 is a graph depicting bulk apparent density comparison of the data of Example 1.

As used herein, the following terms shall have the designated meanings:

"porous particulate material" shall refer to porous ceramic or porous organic polymeric materials. Examples of types of materials suitable for use as porous material particulates include particulates having a porous matrix;

"selectively configured porous particulate material" shall refer to any porous particulate material, natural or non-natural, which has been chemically treated, such as treatment with a coating material; treatment with a penetrating material; or modified by glazing. The term shall include, but not be limited to, those porous particulate materials which have been altered to achieve desired physical properties, such as particle characteristics, desired strength and/or apparent density in order to fit particular downhole conditions for well treating such as hydraulic fracturing treatments and sand control treatments.

"non-selectively configured porous particulate material" shall refer to any porous natural ceramic material, such as lightweight volcanic rocks, like pumice, as well as perlite and other porous "lavas" like porous (vesicular) Hawaiian Basalt, porous Virginia Diabase, and Utah Rhyolite. Further, inorganic ceramic materials, such as alumina, magnetic glass, titanium oxide, zirconium oxide, and silicon carbide may also be used. In addition, the term shall refer to a synthetic porous particulate material which has not been chemically treated and which imparts desired physical properties, such as particle characteristics, desired strength and/or apparent density in order to fit particular downhole conditions for well treating;

"relatively lightweight" shall refer to a porous particulate material that has a apparent density (API RP 60) that is substantially less than a conventional particulate material employed in hydraulic fracturing or sand control operations, such as sand having an apparent specific gravity (API RP 60) of 2.65 and bauxite having an apparent specific gravity of 3.55. The apparent specific gravity of a relatively lightweight material is less than about 2.4.

"substantially neutrally buoyant" shall refer to a porous particulate material that has an apparent density sufficiently close to the apparent density of a selected ungelled or weakly gelled carrier fluid, such as an ungelled or weakly gelled completion brine, other aqueous-based fluid, slick water, or other suitable fluid, which allows pumping and satisfactory placement of the proppant/particulate using the selected ungelled or weakly gelled carrier fluid.

a "weakly gelled carrier fluid" is a carrier fluid having a viscosifier or friction reducer to achieve friction reduction when pumped down hole, for example when pumped down tubing, work string, casing, coiled tubing, drill pipe, or similar location, wherein the polymer or viscosifier concentration from about 0 pounds of polymer per thousand gallons of base fluid to about 10 pounds of polymer per thousand gallons of base fluid, and/or the viscosity from about 1 to about 10 centipoises. An "ungelled carrier fluid" is a carrier fluid having no polymer or viscosifier. The ungelled carrier fluid may contain a friction reducer known in the art.

The selectively configured porous particulate materials as well as non-selectively configured porous particulate materials are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

For instance, the selectively configured porous material particles or non-selectively configured porous material particles may be mixed and pumped during any desired portion/s of a well treatment such as hydraulic fracturing treatment or sand control treatment and may be mixed in any desired concentration with a carrier fluid. In this regard, any carrier fluid suitable for transporting the selectively configured porous particulate material or non-selectively configured porous particulate material particles into a well and/or subterranean formation fracture in communication therewith may be employed including, but not limited to, carrier fluids comprising salt water, fresh water, potassium chloride solution, a saturated sodium chloride solution, liquid hydrocarbons, and/or nitrogen or other gases may be employed. Suitable carrier fluids include or may be used in combination with fluids have gelling agents, cross-linking agents, gel breakers, surfactants, foaming agents, demulsifiers, buffers, clay stabilizers, acids, or mixtures thereof.

When used in hydraulic fracturing, the selectively configured porous particulate material or non-selectively configured porous particulate material particles may be injected into a subterranean formation in conjunction with a hydraulic fracturing treatment or other treatment at pressures sufficiently high enough to cause the formation or enlargement of fractures. Such other treatments may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulate. Further information on hydraulic fracturing methods and materials for use therein may be found in U.S. Pat. No. 6,059,034 and in U.S. Pat. No. 6,330,916, which are incorporated herein by reference.

When employed in well treatments, selected porous material particles that have been selectively configured, such as glazed and/or treated with one or more selected coating and/or penetrating materials, may be introduced into a wellbore at any concentration/s deemed suitable or effective for the downhole conditions to be encountered. For example, a well treatment fluid may include a suspension of proppant or sand control particulate that is made up completely of relatively lightweight selected porous material particles that have been selectively configured, such as glazed and/or treated with one or more selected coating and/or penetrating materials. Alternatively, it is possible that a well treatment fluid may include a suspension that contains a mixture of conventional fracture proppant or sand control particulates such as sand with relatively lightweight selected porous material particles that have been selectively configured such as glazed and/or treated with one or more selected coating and/or penetrating materials.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the selectively configured porous particulate material or non-selectively configured porous particulate material and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of selectively configured porous particulate material or the non-selectively configured porous particulate material. In the latter case, the balance of the particulate material of the slurry may be another material, such as a conventional gravel pack particulate.

As an alternative to use of a screen, the sand control method may use the selectively configured porous particulate material or non-selectively configured porous particulate material in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The porous particulate material shall include any naturally occurring or manufactured or engineered porous ceramic particulate material that has an inherent and/or induced porosity. A commercially available instrument, ACCUPYC 1330 Automatic Gas Pycnometer (Micromeritics, Norcross, Ga.), that uses Helium as an inert gas and the manufacturer's recommended procedure can be used to determine the internal porosity of the particulates. The internal porosity is generally from about 10 to 75 volume percent. Such particulate material may also have an inherent or induced permeability, i.e., individual pore spaces within the particle are interconnected so that fluids are capable of at least partially moving through the porous matrix, such as penetrating the porous matrix of the particle, or may have inherent or induced non-permeability, individual pore spaces within the particle are disconnected so that fluids are substantially not capable of moving through the porous matrix, such as not being capable of penetrating the porous matrix of the particle. The degree of desired porosity interconnection may be selected and engineered into the non-selectively configured porous particulate material. Furthermore such porous particles may be selected to have a size and shape in accordance with typical fracturing proppant particle specifications (i.e., having a uniform shape and size distribution), although such uniformity of shape and size is not necessary.

The apparent specific gravity of the porous particulate material is generally less than or equal to 2.4, preferably less than or equal to 2.0, even more preferably less than or equal to 1.75, most preferably less than or equal to 1.25.

In a selectively configured porous particulate material, the particles may be selected based on porosity and/or permeability characteristics so that they have desired lightweight characteristics, such as when suspended in a selected carrier fluid for a well treatment. As before, the inherent and/or induced porosity of a porous material particle may be selected so as to help provide the desired balance between apparent density and strength. Optional materials may be employed along with a glazing, penetrating and/or coating material to control penetration, such as enhancing or impairing penetration. For example, in one embodiment an cationic clay stabilizer, such as CLAY MASTER 5C from BJ Services, may be first applied to the exterior surface of a porous ceramic material to inhibit penetration by coating/penetrating material, such as epoxy or resin described elsewhere herein.

In a preferred embodiment, the porous particulate material is a relatively lightweight or substantially neutral buoyant particulate material. Such materials may be employed in a manner that eliminates the need for gellation of carrier fluid, thus eliminating a source of potential proppant pack and/or formation damage. Furthermore, a relatively lightweight particulate material may be easier to place within a targeted zone due to lessened settling constraints, and a reduced mass of such relatively lightweight particulate material is generally required to fill an equivalent volume than is required with conventional sand control particulates, used, for example, for gravel packing purposes.

Relatively lightweight and/or substantially neutrally buoyant fracture proppant/particulate material used in hydraulic fracturing/sand control treatment, such as porous ceramic particles having untreated bulk apparent density of 1.16 and untreated porosity of about 59.3%, may be employed.

In one embodiment, the disclosed porous material particulates may be employed as relatively lightweight particulate/proppant material that may be introduced or pumped into a well as neutrally buoyant particles in, for example, a saturated sodium chloride solution carrier fluid or a carrier fluid that is any other completion or workover brine known in the art, thus eliminating the need for damaging polymer or fluid loss material. In one embodiment, such a material may be employed as proppant/sand control particulate material at temperatures up to about 700° F., and closure stresses up to about 8000 psi. However, these ranges of temperature and closure stress are exemplary only, it being understood that the disclosed materials may be employed as proppant/sand control materials at temperatures greater than about 700° F. and/or at closure stresses greater than about 8000 psi. In any event, it will be understood with benefit of this disclosure that porous particulate material and/or coating/penetrating materials may be selected by those of skill in the art to meet and withstand anticipated downhole conditions of a given application.

In those embodiments where the disclosed porous material particulates are employed as relatively lightweight and/or substantially neutrally buoyant particulate/proppant materials, they may be employed with carrier fluids that are gelled, non-gelled, or that have a reduced or lighter gelling requirement as compared to carrier fluids employed with conventional fracture treatment/sand control methods. In one embodiment employing one or more of the disclosed substantially neutrally buoyant particulate materials and a brine carrier fluid, mixing equipment need only include such equipment that is capable of (a) mixing the brine (dissolving soluble salts), and (b) homogeneously dispersing in the substantially neutrally buoyant particulate material. In one embodiment, a substantially neutrally buoyant particulate/proppant material may be advantageously pre-suspended and stored in a storage fluid, such as brine of near or substantially equal density, and then pumped or placed downhole as is, or diluted on the fly.

Examples of non-natural porous particulate materials for use in the invention include, but are not limited to, porous ceramic particles such as those particles available from Carbo Ceramics Inc. as "Econoprop", and those fired kaolinitic described in U.S. Pat. No. 5,188,175 which is incorporated herein by reference. As described in this reference such particles may include solid spherical pellets or particles from raw materials (such as kaolin clay) having an alumina content of between about 25% and 40% and a silica content of between about 50% and 65%. A starch binder may be employed. Such particles may be characterized as having a ratio of silicon dioxide to alumina content of from about 1.39 to about 2.41, and a apparent specific gravity of between about 2.20 and about 2.60 or between about 2.20 and about 2.70.

It will also be understood that porous ceramic particles may be selectively manufactured from raw materials such as those described in U.S. Pat. No. 5,188,175; U.S. Pat. No. 4,427,068; and U.S. Pat. No. 4,522,731, which are each incorporated herein by reference, such as by inclusion of selected process steps in the initial material manufacturing process to result in a material that possesses desired characteristics of porosity, permeability, apparent density or apparent specific gravity, combinations thereof. For example, such raw materials may be fired at relatively low temperature of about 1235° F. or about 1300° F. (or about 700° C.) to achieve a desired crystalline structure and a more highly porous and lighter structure. In one exemplary embodiment of such particles, as described elsewhere herein, about 20/40 mesh size porous material fired kaolinitic particles from Carbo Ceramics Inc. may be selected for use in the disclosed method. These particles have the following internal characteristics: bulk apparent density about 1.16, internal porosity about 59.3%. These particles may be treated with a variety of penetrating/coating materials in an amount of from about 0.5 to about 10% by total weight of particle. Such coated particles may be manufactured and/or supplied, for example, by Fritz Industries of Mesquite, Texas.

In one exemplary case, size of such a material may be selected to range from about 200 mesh to about 8 mesh.

In such a case, the particles may be selected based on porosity and/or permeability characteristics so that they have desired lightweight characteristics, such as when suspended in a selected carrier fluid for a well treatment. As before, the inherent and/or induced porosity of a porous material particle may be selected so as to help provide the desired balance between apparent density and strength. Optional materials may be employed along with a glazing, penetrating and/or coating material to control penetration such as enhance or impair penetration. For example, in one embodiment an cationic clay stabilizer, such as CLAY MASTER 5C from BJ Services, may be first applied to the exterior surface of a porous ceramic material to inhibit penetration by coating/penetrating material, such as epoxy or resin described elsewhere herein.

In a selectively configured porous particulate material, the porous particulate material is chemically treated in order to impart desired physical properties, such as porosity, permeability, apparent density or apparent specific gravity, or combinations thereof to the particulate materials. Such desired physical properties are distinct from the physical properties of the porous particulate materials prior to treatment.

The desired physical properties may further be present in non-selectively configured porous particulate materials. Non-selectively configured porous particulate materials shall include naturally occurring porous ceramic materials as well as nonnatural (synthetic) materials manufactured in a manner that renders such desired characteristics.

The non-selectively configured particulate material is selected based on desired physical properties, such as porosity, permeability, apparent density, particle size, chemical resistance or combinations thereof.

The selectively configured porous particulate material as well as non-selectively configured porous particulate material exhibit crush resistance under conditions as high as 10,000 psi closure stress, API RP 56 or API RP 60, generally between from about 250 to about 8,000 psi closure stress, in combination with a apparent specific gravity less than or equal to 2.4, to meet the pumping and/or downhole formation conditions of a particular application, such as hydraulic fracturing treatment, sand control treatment.

Such desired physical properties may be imparted to a portion or portions of the porous particulate material of the selectively configured porous particulate material or non-selectively configured porous particulate material, such as on the particle surface of the material particulate, at or in the particle surface of the particulate material, in an area near the particle surface of a particulate material, in the interior particle matrix of a particulate material or a portion thereof, combinations thereof, etc.

Advantageously, in one embodiment the low apparent specific gravity of the porous particulate material of the selectively configured porous particulate material or non-selectively configured porous particulate material may be taken advantage of to result in a larger fracture or frac pack width for the same loading, such as pound per square foot of proppant, to give much larger total volume and increased width for the same mass. Alternatively, this characteristic allows for smaller loading of proppant material to be pumped while still achieving an equivalent width.

In a preferred embodiment, selective configuration, such as by using glaze-forming, coating and/or penetrating materials, such as those materials described elsewhere herein, may be selectively employed to modify or customize the apparent specific gravity of a selected porous particulate material. Modification of particulate apparent specific gravity, to have a greater or lesser apparent specific gravity, may be advantageously employed, for example, to provide proppant or sand control particulates of customized apparent specific gravity for use as a substantially neutrally buoyant particulate with a variety of different weight or apparent specific gravity carrier fluids.

The selectively configured porous particulate material has an apparent density from about 1.1 $g/cm^3$ to about 2.6 $g/cm^3$, a bulk apparent density from about 1.03 $g/cm^3$ to about 1.5 $g/cm^3$, and an internal porosity from about 10 to about 75 volume percent. In one example, bulk densities may be controlled to be in the range of from about 1.1 $g/cm^3$ to about 1.5 $g/cm^3$, although greater and lesser values are also possible.

The selectively configured porous particulate material, as well as the non-selectively configured particulate material, is generally between from about 200 mesh to about 8 mesh.

The selectively configured porous particulate material may comprise porous particulate material selectively altered by treating with a coating or penetrating material using any suitable wet or dry process. Methods for coating particulates, such as fracture proppant particles, with materials such as resin are known in the art, and such materials are available, for example, from manufacturers listed herein. With regard to coating of the disclosed porous particulate materials, coating operations may be performed using any suitable methods known in the art.

As used herein, the term "penetration" shall further refer to partially or completely impregnated with a penetrating material, by for example, vacuum and/or pressure impregnation. For example, porous particulate material may be immersed in a second material and then exposed to pressure and/or vacuum to at least partially penetrate or impregnate the material.

Those of skill in the art will understand that one or more coating and/or penetrating materials may be selected to treat a porous material particulate to meet particular criteria or requirements of given downhole application based on the information and examples disclosed herein, as well as knowledge in the art. In this regard, porous material particle characteristics, such as composition, porosity and permeability characteristics of the particulate material, size, and/or coating or penetrating material characteristics, such as composition, amount, thickness or degree of penetration, may be so selected. The coating or penetrating material is typically non-porous.

The porosity and permeability characteristics of the porous particulate material allows the penetrating material to be drawn at least partially into the porous matrix of the porous particulate material by capillary action, for example, in a manner similar to a sponge soaking up water. Alternatively, one or more penetrating materials may be drawn at least partially into the porous matrix of the porous particulate material using a vacuum, and/or may be forced at least partially into the porous matrix under pressure.

Examples of penetrating materials that may be selected for use include, but are not limited to, liquid resins, plastics, cements, sealants, binders or any other material suitable for at least partially penetrating the porous matrix of the selected particle to provide desired characteristics of strength/crush resistance, apparent specific gravity, etc. It will be understood that selected combinations of any two or more such penetrating materials may also be employed, either in mixture or in sequential penetrating applications.

Examples of resins that may be employed as penetrating and/or coating materials include, but are not limited to, resins and/or plastics or any other suitable cement, sealant or binder that once placed at least partially within a selected particle may be crosslinked and/or cured to form a rigid or substantially rigid material within the porous structure of the particle. Specific examples of plastics include, but are not limited to, nylon, polyethylene, styrene, etc. and combinations thereof. Suitable resins include phenol formaldehyde resins, melamine formaldehyde resins, and urethane resins, low volatile urethane resins, such as these and other types of resins available from Borden Chemical Inc., Santrol, Hepworth of England, epoxy resins and mixtures thereof. Specific examples of suitable resins include, but are not limited to, resins from Borden Chemical and identified as 500-series and 700-series resins (e.g., 569C, 794C, etc.). Further specific examples of resins include, but are not limited to, SIGMASET series low temperature curing urethane resins from Borden Chemical, such as SIGMASET, SIGMASET LV, SIGMASET XL, ALPHASET phenolic resin from Borden Chemical, OPTI-PROP phenolic resin from Santrol, and POLAR PROP low temperature curing resin from Santrol. Where desired, curing characteristics, such as curing time, may be adjusted to fit particular treatment methods and/or final product specifications by, for example, adjusting relative amounts of resin components. Still further examples of suitable resins and coating methods include, but are not limited to, those found in European Patent Application EP 0 771 935 A1; and in U.S. Pat. Nos. 4,869,960; 4,664,819; 4,518,039; 3,929,191; 3,659,651; and 5,422,183, each of the foregoing references being incorporated herein by reference in its entirety.

In one exemplary embodiment, a curable phenolic resin or other suitable curable material may be selected and applied as a coating material so that individual coated particles may be bonded together under downhole temperature, after the resin flows and crosslinks/cures downhole, such as to facilitate proppant pack/sand control particulate consolidation after placement.

Alternatively, a cured phenolic type resin coat or other suitable cured material may be selected to contribute additional strength to the particles and/or reduce in situ fines migration once placed in a subterranean formation. The degree of penetration of the coating or penetrating fluid into the porous particulate material may be limited by disconnected porosity, such as substantially impermeable or isolated porosity, within the interior matrix of the particulate.

This may either limit the extent of uniform penetration of penetrating material in a uniform manner toward the core, such as leaving a stratified particle cross section having outside penetrating layer with unpenetrated substantially spherical core, and/or may cause uneven penetration all the way to the core, such as bypassing "islands" of disconnected porosity but penetrating all the way to the core. In any event, a penetrating and/or coating material may trap or encapsulate air (or other fluid having apparent specific gravity less than particle matrix and less than coating/penetrating material) within the disconnected porosity in order to reduce apparent specific gravity by the desired amount. Such materials coat and/or penetrate the porous particulate without invading the porosity to effectively encapsulate the air within the porosity of the particle. Encapsulation of the air provides preservation of the ultra-lightweight character of the particles once placed in the transport fluid. If the resin coating or transport fluids were to significantly penetrate the porosity of the particle, the density increases accordingly, and the particle no longer has the same lightweight properties. The resin coat also adds strength and substantially enhances the proppant pack permeability at elevated stress.

Coating layers may be applied as desired to contribute to particle strength and/or reduce in situ fines migration once placed in a subterranean formation. The coating significantly increases the strength and crush resistance of the ultra-lightweight ceramic particle. In the case of natural sands the resin coat protects the particle from crushing, helps resist embedment, and prevents the liberation of fines.

The coating or penetrating fluid is typically selected to have an apparent specific gravity less than the apparent specific gravity of the porous particulate material so that once penetrated at least partially into the pores of the matrix it results in a particle having a apparent specific gravity less than that of the porous particulate material prior to coating or penetration, i.e., filling the pore spaces of a porous particulate material results in a solid or substantially solid particle having a much reduced apparent density.

For example, the selected porous particulate material may be treated with a selected penetrating material in such a way that the resultant selectively configured porous particulate material has a much reduced apparent density, such as having a apparent density closer to or approaching the apparent specific gravity of a carrier fluid so that it is neutrally buoyant or semi-buoyant in a fracturing fluid or sand control fluid.

Alternatively, a penetrating material may be selected so that it helps structurally support the matrix of the porous particulate material (i.e., increases the strength of the porous matrix) and increases the ability of the particulate to withstand the closure stresses of a hydraulic fractured formation, or other downhole stresses.

For example, a penetrating material may be selected by balancing the need for low apparent density versus the desire for strength, i.e., a more dense material may provide much greater strength. In this regard, the inherent and/or induced porosity of the porous particulate material may be selected so as to help provide the desired balance between apparent density and strength. It will be understood that other variable, such as downhole temperature and/or fluid conditions, may also impact the choice of penetrating materials.

The coating layer or penetrating material is generally present in the selectively configured porous particulate material in an amount of from about 0.5% to about 10% by weight of total weight. The thickness of the coating layer of the selectively configured porous particulate material is generally between from about 1 to about 5 microns. The extent of penetration of the penetrating material of the selectively configured porous particulate material is from less than about 1% penetration by volume to less than about 25% penetration by volume.

Especially preferred results are obtained when the porous particulate material is a porous ceramic particle having an apparent density of 1.25 or less and untreated porosity is approximately 60%. Such materials may be treated with a coating material that does not penetrate the porous matrix of the porous particulate material, or that only partially penetrates the porous matrix of the ceramic particulate material. Such treated ceramic materials may have an apparent density from about 1.1 $g/cm^3$ to about 1.8 $g/cm^3$ (alternatively from about 1.75 $g/cm^3$ to about 2 $g/cm^3$ and further alternatively about 1.9 $g/cm^3$), a bulk apparent density from about 1.03 $g/cm^3$ to about 1.5 $g/cm^3$, and a treated internal porosity from about 45% to about 55%. However, values outside these exemplary ranges are also possible.

As an example, a porous ceramic treated with about 6% epoxy has been seen to exhibit a bulk apparent density of about 1.29 and a porosity of about 50.6%, a porous ceramic treated with about 8% epoxy exhibits a bulk apparent density of about 1.34 and a porosity of about 46.9%, a porous ceramic treated with about 6% phenol formaldehyde resin exhibits a bulk apparent density of about 1.32 and a porosity of about 51.8%, and a porous ceramic treated with about 8% phenol formaldehyde resin exhibits a bulk apparent density of about 1.20 and a porosity of about 54.1%.

In this embodiment, a coating material or penetrating material may be selected to be present in an amount of from about 0.5% to about 10% by weight of total weight of individual particles. When present, thickness of a coating material may be selected to be from about 1 to about 5 microns on the exterior of a particle. When present, extent of penetration penetrating material into a porous material particle may be selected to be from less than about 1% penetration by volume to less than about 25% penetration by volume of the particle. It will be understood that coating amounts, coating thickness, and penetration amounts may be outside these exemplary ranges as well.

Further, the porous particulate material may be at least partially selectively configured by glazing, such as, for example, surface glazing with one or more selected non-porous glaze materials. In such a case, the glaze, like the coating or penetrating material, may extend or penetrate at least partially into the porous matrix of the porous particulate material, depending on the glazing method employed and/or the permeability (i.e., connectivity of internal porosity) characteristics of the selected porous particulate material, such as non-connected porosity allowing substantially no penetration to occur. For example, a selected porous particulate material may be selectively configured, such as glazed and/or coated with a non-porous material, in a manner so that the porous matrix of the resulting particle is at least partially or completely filled with air or some other gas, i.e., the interior of the resulting particle includes only air/gas and the structural material forming and surrounding the pores. Once again, the inherent and/or induced porosity of a porous material particle may be selected so as to help provide the desired balance between apparent density and strength, and glazing and/or coating with no penetration (or extension of configured area into the particle matrix) may be selected to result in a particle having all or substantially all porosity of the particle being unpenetrated and encapsulated to trap air or other relatively lightweight fluid so as to achieve minimum apparent specific gravity. In addition to sealing a particle, such as to seal air/gas within the porous matrix of the particle, such selective configuration, such as using glazing and/or coating materials, may be selected to provide other advantages.

In a preferred embodiment, the porous particulate material, such as the above-described fired kaolinitic particles, is manufactured by using a glaze-forming material to form a glaze to seal or otherwise alter the permeability of the particle surface, so that a given particle is less susceptible to invasion or saturation by a well treatment fluid and thus capable of retaining relatively lightweight or substantially neutrally buoyant characteristics relative to the well treatment fluid upon exposure to such fluid. Such glazing may be accomplished using any suitable method for forming a glaze on the surface or in the near surface of a particle, including by incorporating a glaze-forming material into the raw material "green paste" that is then formed such as molded into shape of the particle prior to firing. Those skilled in the art recognize that glazes may be made from a variety of methods, including the application of a smooth, glassy coating such that a hard, nonporous surface is formed. Glazes may be formed from powdered glass with oxides. The mixture of powders is suspended in water and applied to the substrate. The glaze can be dried and then fixed onto the substrate by firing or similar process known to those skilled in the art. Additionally, the use of borates or similar additives may improve the glaze.

Examples of such glaze-forming materials include, but are not limited to, materials such as magnesium oxide-based material, boric acid/boric oxide-based material, etc. During firing, the glaze-forming material/s "bloom" to the surface of the particles and form a glaze. Alternatively, glazing may be accomplished, for example, by applying a suitable glaze-forming material onto the surface of the formed raw material or "green" particles prior to firing such as by spraying, dipping, and similar methods so that glazing occurs during particle firing. Further alternatively, a glaze-forming material may be applied to a fired ceramic particle, and then fired again in a separate glaze-forming step. In one embodiment, the glaze forms a relatively hard and relatively non-porous surface during firing of the particles.

Advantages of such a glazing treatment include maintaining the relatively low apparent density of a relatively lightweight porous particle without the necessity of further alteration, such as necessity of coating with a separate polymer coating although optional coatings may be applied if so desired. Furthermore, the resulting relatively smooth glazed surface of such a particle also may serve to enhance the ease of multi phase fluid flow, such as flow of water and gas and oil, through a particulate pack, such as through a proppant pack in a fracture, resulting in increased fracture conductivity.

In an alternative embodiment, one or more types of the disclosed selectively configured porous particulate material or non-selectively configured porous particulate material may be employed as particulates for well treating purposes in combination with a variety of different types of well treating fluids (including liquid $CO_2$-based systems and other liquefied-gas or foamed-gas carrier fluids) and/or other types of particulates such as to achieve synergistic benefits, it being understood that benefits of the disclosed methods and compositions may also be achieved when employing only one type of the disclosed porous materials as a sole well treating particulate. Furthermore, although exemplary embodiments are described herein with reference to porous materials and to relatively lightweight porous materials, it will be understood that benefits of the disclosed methods and compositions may also be realized when applied to materials that may be characterized as non-relatively lightweight and/or non-porous in nature.

Elimination of the need to formulate a complex suspension gel may mean a reduction in tubing friction pressures, particularly in coiled tubing and in the amount of on-location mixing equipment and/or mixing time requirements, as well as reduced costs. Furthermore, when selectively configured, such as by glazing and/or by treating with coating/penetrating material, to have sufficient strength and relative lightweight properties, the disclosed relatively particles may be employed to simplify hydraulic fracturing treatments or sand control treatments performed through coil tubing, by greatly reducing fluid suspension property requirements. Downhole, a much reduced propensity to settle (as compared to conventional proppant or sand control particulates) may be achieved, particularly in highly deviated or horizontal wellbore sections. In this regard, the disclosed particulate material may be advantageously employed in any deviated well having an angle of deviation of between about 0 degree and about 90 degrees with respect to the vertical. However, in one embodiment, the disclosed particulate material may be advantageously employed in horizontal wells, or in deviated wells having an angle with respect to the vertical of between about 30 degrees and about 90 degrees, alternatively between about 75 degrees and about 90 degrees. Thus, use of the disclosed particulate materials disclosed herein may be employed to achieve surprising and unexpected improvements in fracturing and sand control methodology, including reduction in proppant pack and/or formation damage, and enhancement of well productivity.

It will be understood that the characteristics of glazing materials, penetrating materials and/or coating materials given herein, such as composition, amounts, types, are exemplary only. In this regard, such characteristics may be selected with benefit of this disclosure by those of skill in the art to meet and withstand anticipated downhole conditions of a given application using methods known in the art, such as those described herein.

In another disclosed embodiment, blends of two or more different types of particles having different particulate characteristics, such as different porosity, permeability, apparent density or apparent specific gravity, settling velocity in carrier fluid, may be employed as well treatment particulates. Such blends may contain at least one porous particulate material and at least one other particulate material that may or may not be a porous particulate material.

In addition, the selectively configured porous particulate material and non-selectively configured porous particulate material may be used as two or more multiple layers. In this regard, successive layers of such materials may be employed. For instance, multiple layers may consist of at least one selectively configured porous particulate material and at least one non-selectively configured porous particulate material.

In one exemplary embodiment, a selected coating or penetrating material may be a urethane, such as ethyl carbamate-based resin, applied in an amount of about 4% by weight of the total weight of the selected porous material particle. A selected coating material may be applied to achieve a coating layer of at least about 2 microns thick on the exterior of the selected porous material particle.

Such blends may be further employed in any type of well treatment application, including in any of the well treatment methods described elsewhere herein. In one exemplary embodiment, such blends may be employed to optimize hydraulic fracture geometries to achieve enhanced well productivity, such as to achieve increased propped fracture length in relatively "tight" gas formations. Choice of different particulate materials and amounts thereof to employ in such blends may be made based on one or more well treatment considerations including, but not limited to, objective/s of well treatment, such as for sand control and/or for creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof.

Such different types of particles may be selected, for example, to achieve a blend of different specific gravities or densities relative to the selected carrier fluid. For example, a blend of three different particles may be selected for use in a water fracture treatment to form a blend of well treatment particulates having three different specific gravities, such as apparent specific gravity of first type of particle from about 1 to less about 1.5; apparent specific gravity of second type of particle from greater than about 1.5 to about 2.0; and apparent specific gravity of third type of particle from about greater than about 2.0 to about 3.0; or in one specific embodiment the three types of particles having respective specific gravities of about 2.65, about 1.7 and about 1.2, it being understood that the preceding apparent specific gravity values are exemplary only and that other specific gravities and ranges of specific gravities may be employed. In one example, at least one of the types of selected well treatment particulates may be selected to be substantially neutrally buoyant in the selected carrier fluid.

Such different types of particles may be selected for use in any amount suitable for achieving desired well treatment results and/or costs. However, in one embodiment multiple types of particles may be selected for use in a blend of well treatment particulates in amounts that are about equal in proportion on the basis of total weight of the blend. Thus, three different types of particles may each be employed in respective amounts of about ⅓ of the total blend such as by total weight of the blend, four different types of particles may each be employed in respective amounts of about ¼ of the total blend such as by total weight or the blend. However, these relative amounts are exemplary only, it being understood that any desired relative amount of each selected type of well particulate may be employed, such as for one exemplary embodiment of blend having three different types of particles, such as selected from the different types of particles described elsewhere herein, the amounts of each selected type of particle may be present in the blend in an amount ranging from about 10% to about 40% such as by total weight of the blend to achieve 100% weight of the total blend.

It will be understood with benefit of this disclosure that choice of different particulate materials and amounts thereof to employ in such blends may be made using any methodology suitable for evaluating such blends in view of one or more desired well treatment considerations. In one embodiment, any method known in the art suitable for modeling or predicting sand control pack or fracture pack geometry/conductivity may be employed, such as illustrated and described in relation to Example 4 herein.

Examples of different particle types which may be selected for use in such blends include, but are not limited to, conventional sand particulates, such as Ottawa sand, relatively lightweight well treatment particulates, such as ground or crushed nut shells at least partially surrounded by at least one layer component of protective or hardening coating, selectively configured porous materials, such as any one or more of the selectively configured porous materials described herein, such as deformable particles. Further examples of particle types which may be selected for use in such blends include any of those particles described in U.S. patent application Ser. No. 10/113,844, filed Apr. 1, 2002; U.S. patent application Ser. No. 09/579,146, filed May 25, 2000; U.S. Pat. Nos. 6,364,018; 6,330,916; and 6,059,034, each of which is incorporated herein by reference.

In one exemplary embodiment, selected blends of conventional sand proppant, relatively lightweight particulates of ground or crushed nut shells at least partially surrounded by at least one layer component of protective or hardening coating, and selectively configured porous materials such as relatively lightweight porous material fired kaolinitic particles treated with a penetrating/coating materials described herein may be employed in a hydraulic fracture treatment utilizing ungelled or weakly gelled carrier fluid. One specific example of such a blend is described in Example 4 herein. In such an embodiment, these different types of particles may be employed in any relative volume or weight amount or ratio suitable for achieving desired well treatment results.

In one specific example, these different types of particles may be employed in a well treatment particulate composition including about ⅓ by weight of conventional sand proppant by total weight of well treatment particulate, about ⅓ by weight of relatively lightweight particulate, such as core of ground or crushed nut shells at least partially surrounded by at least one layer component of protective or hardening coating) by total weight of well treatment particulate, and about ⅓ by weight of selectively configured relatively lightweight porous material, such as fired kaolinitic particles treated with a penetrating/coating materials described herein, by total weight of well treatment particulate. It will be understood that the foregoing relative amounts are exemplary only and may be varied, for example, to achieve desired results and/or to meet cost objectives of a given treatment. It will also be understood that the disclosed methods and compositions may also be practiced with such blends using other types of relatively lightweight particulate materials as described elsewhere herein, such as porous polymeric materials, such as polyolefins, styrene-divinylbenzene based materials, polyalkylacrylate esters and modified starches. Further, any of the disclosed porous materials may be employed in "neat" or non-altered form in the disclosed blends where apparent density and other characteristics of the particle are suitable to meet requirements of the given well treating application.

In one respect, disclosed are well treating methods, such as hydraulic fracturing and sand control, which may be employed to treat a well penetrating a subterranean formation, and include introducing into a well a selected porous particulate material that is treated with a selected coating material, selected penetrating material, or combination thereof. Individual particles of the particulate material optionally may have a shape with a maximum length-based aspect ratio of equal to or less than about 5. In one embodiment porous particulate materials may be any particulate material with suitable internal porosity and/or permeability characteristics to achieve the desired finished particle properties when combined with selected penetrating/coating materials as described elsewhere herein.

Examples of suitable porous material particulates that may be selected for use in aqueous based carrier fluids include, but are not limited to porous ceramics, porous polymeric materials or any other porous material or combinations thereof suitable for selection for combination of internal porosity and permeability to achieve desired properties, such as strength and/or apparent specific gravity, for particular downhole conditions and/or well treatment applications as described elsewhere herein. For example, porous ceramic particles may be manufactured by firing at relatively low temperatures to avoid loss of porosity due to crystallization and driving off of water. Particular examples include, but are not limited to, porous ceramic particles available from Carbo Ceramics Inc. of Irving, Texas composed of fired kaolinitic clay that is fired at relatively low temperature of about 1235° F. or about 1300° F. (or about 700° C. and that has trace amounts of components such as cristobalite, mullite and opalite), polyolefin particles, and similar components.

In another disclosed embodiment, relatively lightweight particulates or blends including such particulates as described elsewhere herein, such as including selectively configured particulates and/or non-selectively configured particulates described elsewhere herein, may be advantageously employed as well treatment particulates, such as fracture proppant particulate or sand control particulate, in liquefied gas and foamed gas carrier fluids.

Examples of types of such carrier fluids include, but are not limited to, liquid $CO_2$-based systems, liquid $CO_2$, $CO_2/N_2$, and foamed $N_2$ in $CO_2$ systems that may be employed in hydraulic fracturing applications. In one specific embodiment, porous ceramic well particulates having a bulk apparent density of close to or about 1.0 g/cm$^3$, in either selectively configured or non-selectively configured form, may be employed with such liquefied gas and/or foamed gas carrier fluids, such as liquid $CO_2$-based systems, liquid $CO_2$, $CO_2/N_2$, and foamed $N_2$ in $CO_2$ systems. In another specific embodiment, selectively configured particulates and/or non-selectively configured particulates may be employed that may be characterized as substantially neutrally buoyant in such liquefied gas and/or foamed gas carrier fluids.

Liquid $CO_2$ has a density close to about 1.02 g/cm$^3$ under typical fracturing conditions, and conventional proppants, such as sand, or non-relatively lightweight ceramic proppants have a tendency to settle in liquid $CO_2$-based systems. Furthermore, liquid $CO_2$ has very little if any viscosity, and therefore proppant transport in a liquid $CO_2$-based system is provided by turbulence and frictional forces, and fractures created by liquid $CO_2$ are typically relatively narrow. Advantageously, using the disclosed methods and compositions, proppant transport of relatively lightweight particulates is easier than is proppant transport of conventional sand proppants or non-relatively lightweight ceramic proppants.

In one exemplary embodiment, relatively lightweight porous ceramic particles may be employed in liquid $CO_2$-based systems. Examples of types of such relatively lightweight porous ceramic particles include, but are not limited to, those porous ceramic particles available from Carbo Ceramics for controlled release applications altered in the manufacturing process to have a bulk apparent density close to about 1.0 g/cm$^3$. Other suitable examples of relatively lightweight porous particles include, but are not limited to, those particles having a bulk apparent density of less than about 2.5 g/cm$^3$, alternatively having a bulk apparent density of from about 1.0 to about 2.0 g/cm$^3$, further alternatively having a bulk apparent density of from about 1.2 g/cm$^3$ to about 2.0 g/cm$^3$.

One specific example of suitable relatively lightweight porous ceramic particle for use in $CO_2$-based systems of this embodiment is porous ceramic material described elsewhere herein, either in selectively configured form, as described herein in Example 1, or in non-selectively configured or non-altered or "neat" form.

In one exemplary embodiment, the practice of the disclosed methods and compositions, relatively lightweight porous ceramic materials or blends thereof may be employed as fracture proppant materials in liquid $CO_2$-based fracturing systems using methodologies similar or the same to those employed with conventional proppants in liquid $CO_2$-based fracturing systems. In this regard, liquid $CO_2$-based fracturing job characteristics, such as proppant amounts, proppant sizes, mixing and pumping methodologies, using relatively lightweight porous ceramic materials may be the same as described for conventional proppants in "The History and Success of Liquid $CO_2$ and $CO_2/N_2$ Fracturing System" by Gupta and Bobier, SPE 40016, March 1998. Further information on liquid $CO_2$-based fracturing job characteristics that may be employed with relatively lightweight porous ceramic materials may be found in U.S. Pat. Nos. 4,374,545, 5,558, 160, 5,883,053, Canadian Patent No. 2,257,028 and Canadian Patent No. 2,255,413, each of the foregoing references being incorporated herein by reference.

In one disclosed exemplary embodiment, relatively lightweight porous ceramic particles employed as fracture proppant particulate in a liquid $CO_2$-based system may be used in "neat" or non-altered form and may have a apparent specific gravity of from about 1.17 to about 2.0 In another disclosed exemplary embodiment, using relatively lightweight porous ceramic particles as fracture proppant particulate in a liquid $CO_2$-based system allows the concentration of proppant in such a system to be advantageously extended to about 1200 Kg/cubic meter. Other advantages of using the disclosed relatively lightweight porous ceramic particles in liquid $CO_2$-based fracturing systems include, but are not limited to, reduced proppant settling in surface mixing equipment prior to pumping downhole and improved proppant transport downhole and into the formation. It will be understood that although described above for embodiments employing relatively lightweight porous ceramic particles, the disclosed methods and compositions may also be practiced with liquid $CO_2$-based systems using other relatively lightweight porous material particulate materials and blends thereof described elsewhere herein, such as porous polymeric materials such as polyolefins. Any of such materials may be employed in "neat" or non-altered form with liquid $CO_2$-based systems where apparent density and other characteristics of the particle are suitable to meet requirements of the given well treating application, or may alternatively be employed in selectively configured form as described elsewhere herein.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

The following examples are illustrative and should not be construed as limiting the scope of the invention or claims thereof.

Example 1

To obtain the data for this example, the following procedure was followed: Measured mass of 25 ml of sample on a graduate cylinder. Cylinder was tapped several times on the countertop and the volume adjusted to an even 25 ml prior to weighing. Mass/volume=bulk density.

The data of this example is shown in Table 1:

TABLE 1

Bulk Densities

| Sand | 1.721 |
|---|---|
| CarboLite | 1.747 |
| Porous Ceramic—Neat | 1.191 |
| Porous Ceramic—2/2 | 1.238 |
| Porous Ceramic—6% | 1.293 |
| Porous Ceramic—8% P-A | 1.224 |
| Porous Ceramic—8% P-B | 1.198 |
| Porous Ceramic—10% P | 1.32 |

FIG. 1 illustrates comparisons of the bulk densities of various proppants/sand control materials to samples of a selected porous ceramic material (from Carbo Ceramics, Inc.).

In the examples, "Carbolite" is a commercial proppant available from Carbo Ceramics, Inc. "Neat" is untreated porous ceramic material from Carbo Ceramics, Inc., "2/2" is porous ceramic material from Carbo Ceramics, Inc. treated with 2% by weight of particle epoxy inner coating/penetrating material (epoxy is reaction product of epichlorohydrin and bis-phenol A) and with 2% by weight of particle phenol formaldehyde resin outer coating material, "6%" is porous ceramic material from Carbo Ceramics, Inc. treated with 6% by weight of particle coating/penetrating material (epoxy is reaction product of epichlorhidian and bis-phenol A), "8% P-A" is porous ceramic material from Carbo Ceramics, Inc. treated with 8% by weight of particle phenol formaldehyde resin (Sample A), "8% P-B" is porous ceramic material from Carbo Ceramics, Inc. treated with 8% by weight of particle phenol formaldehyde resin (Sample B), and "10% P" is porous ceramic material from Carbo Ceramics, Inc. treated with 10% by weight of particle phenol formaldehyde resin.

Data is presented for both the untreated porous material particle, and for the porous material particle treated with various types and concentrations of selected penetrating materials. As may be seen, the bulk apparent density of the resulting particles varies with varying degree of infiltration or penetration of the penetrating material into the porous ceramic particle. The samples designated as 2/2 and 8% P-B may be characterized from SEM thin section analysis as having limited penetration towards the core of the particle, apparent effective encapsulation of the air in the particle core porosity, yet substantial enhancement of the particle strength as illustrated by the conductivity tests.

Figure 2:
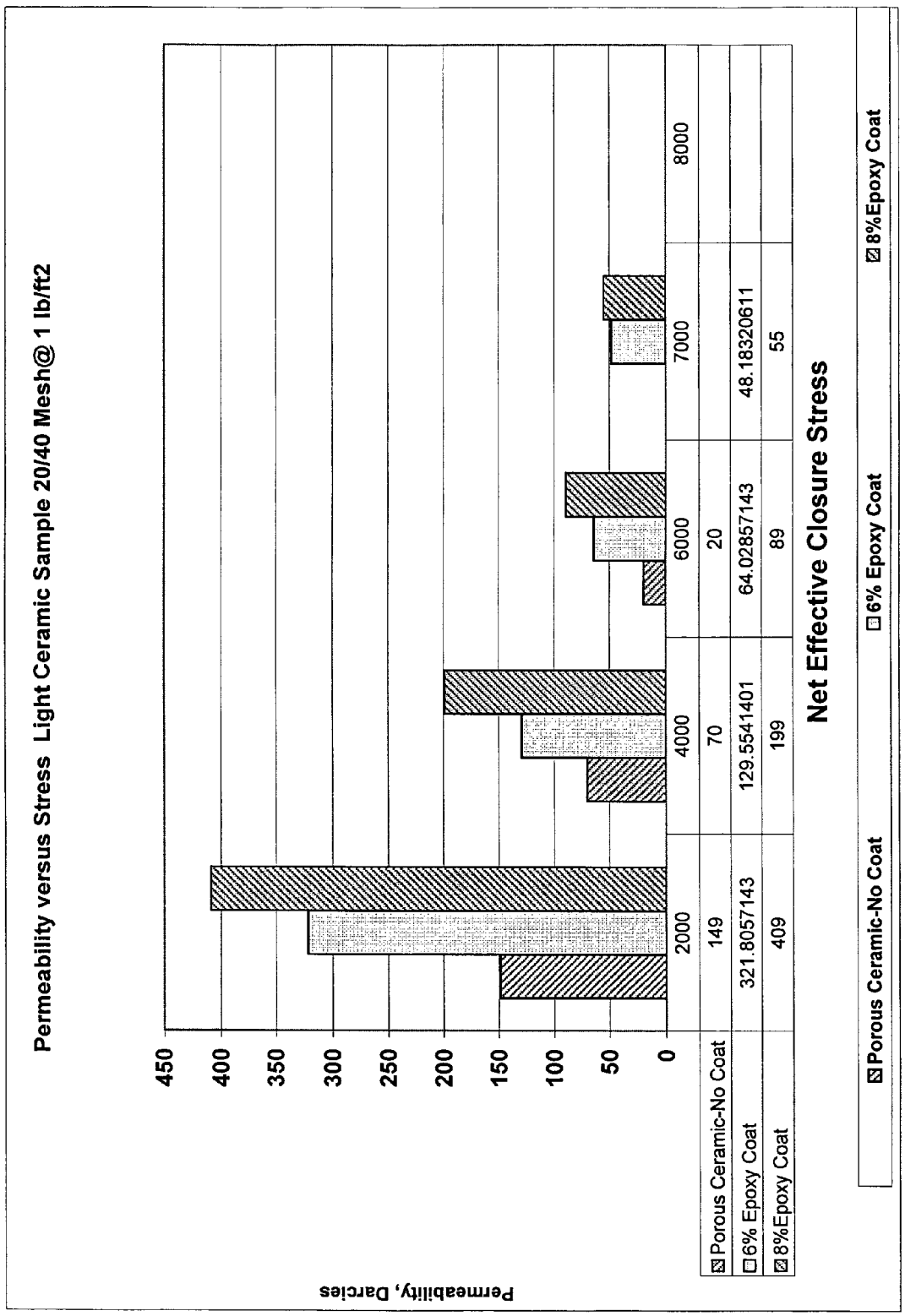
FIG. 2 is a graph depicting permeability versus closure stress data of Example 2.
Figure 3:
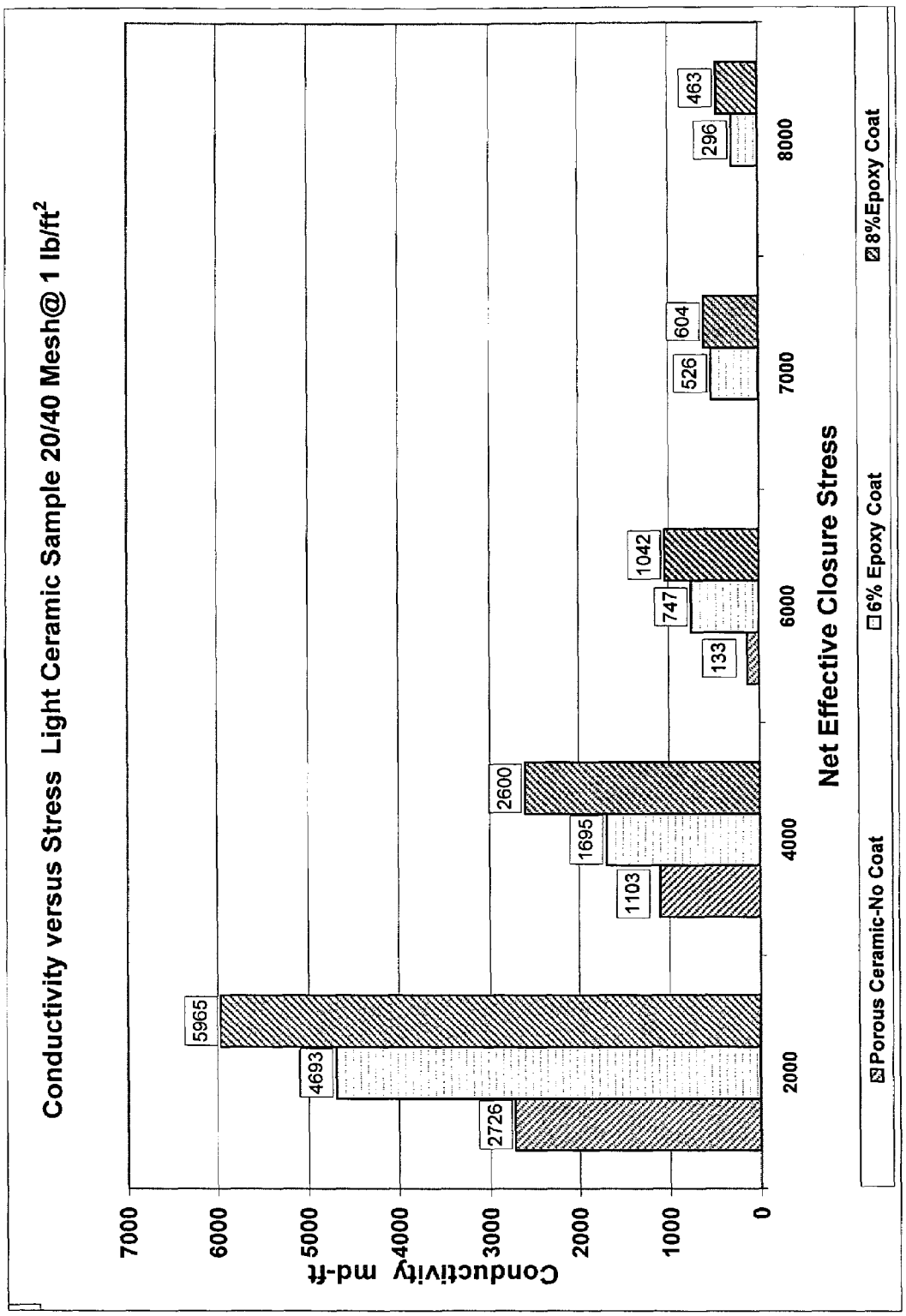
FIG. 3 is a graph depicting conductivity versus closure stress data of Example 2.
Figure 4:
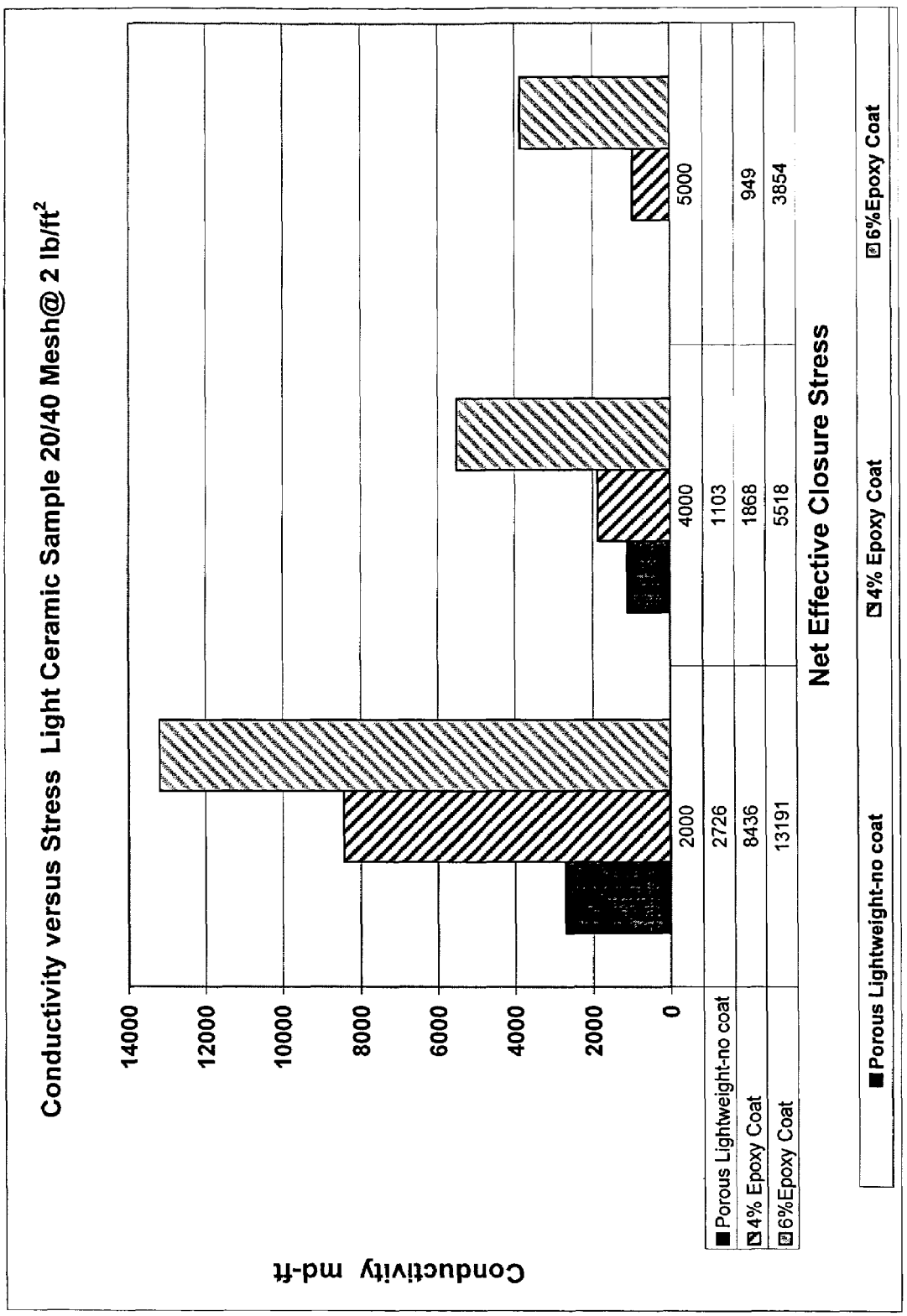
FIG. 4 is a graph depicting conductivity versus closure stress data of Example 2.
Figure 5:
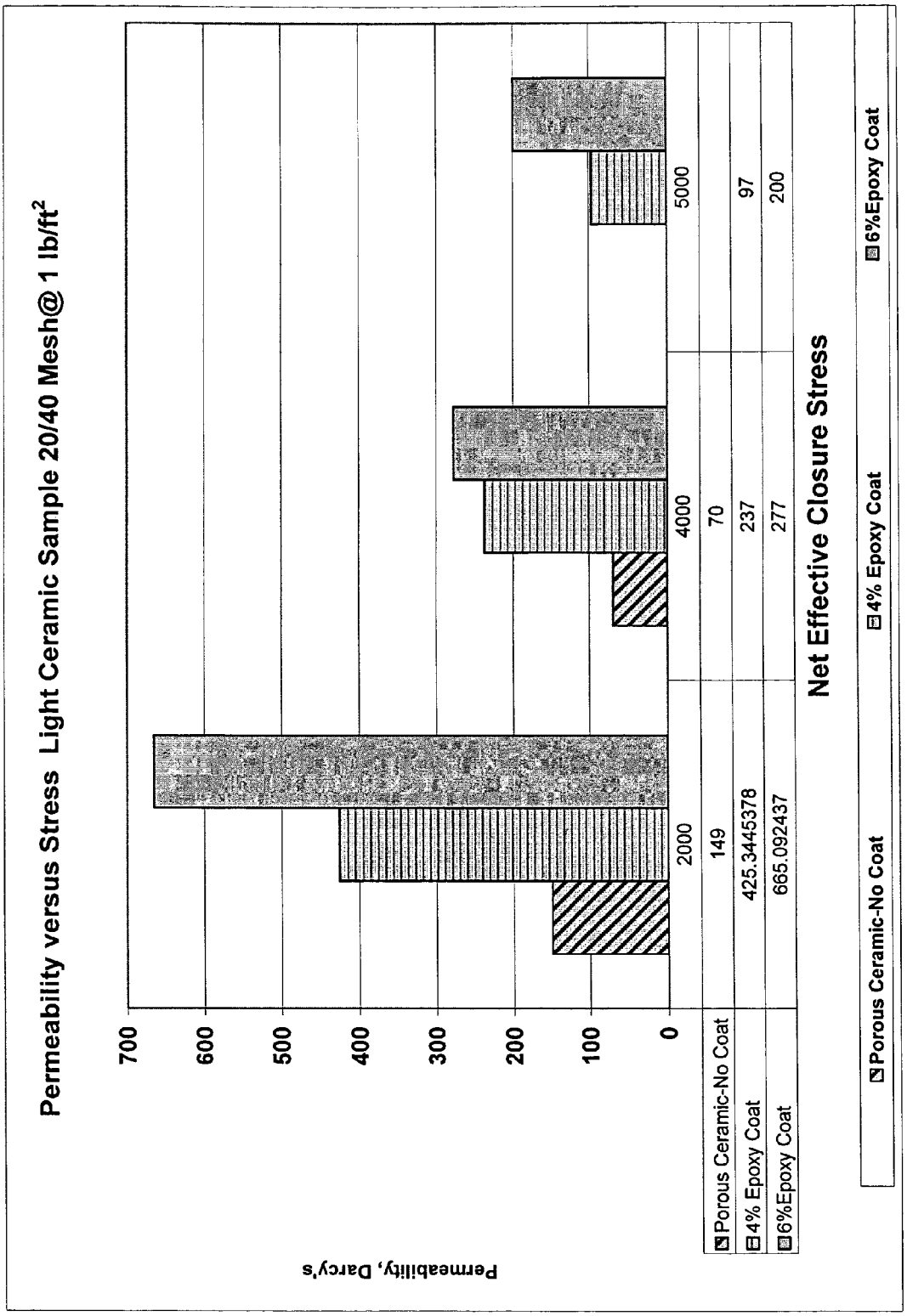
FIG. 5 is a graph depicting permeability versus closure stress data of Example 2.
Figure 6:
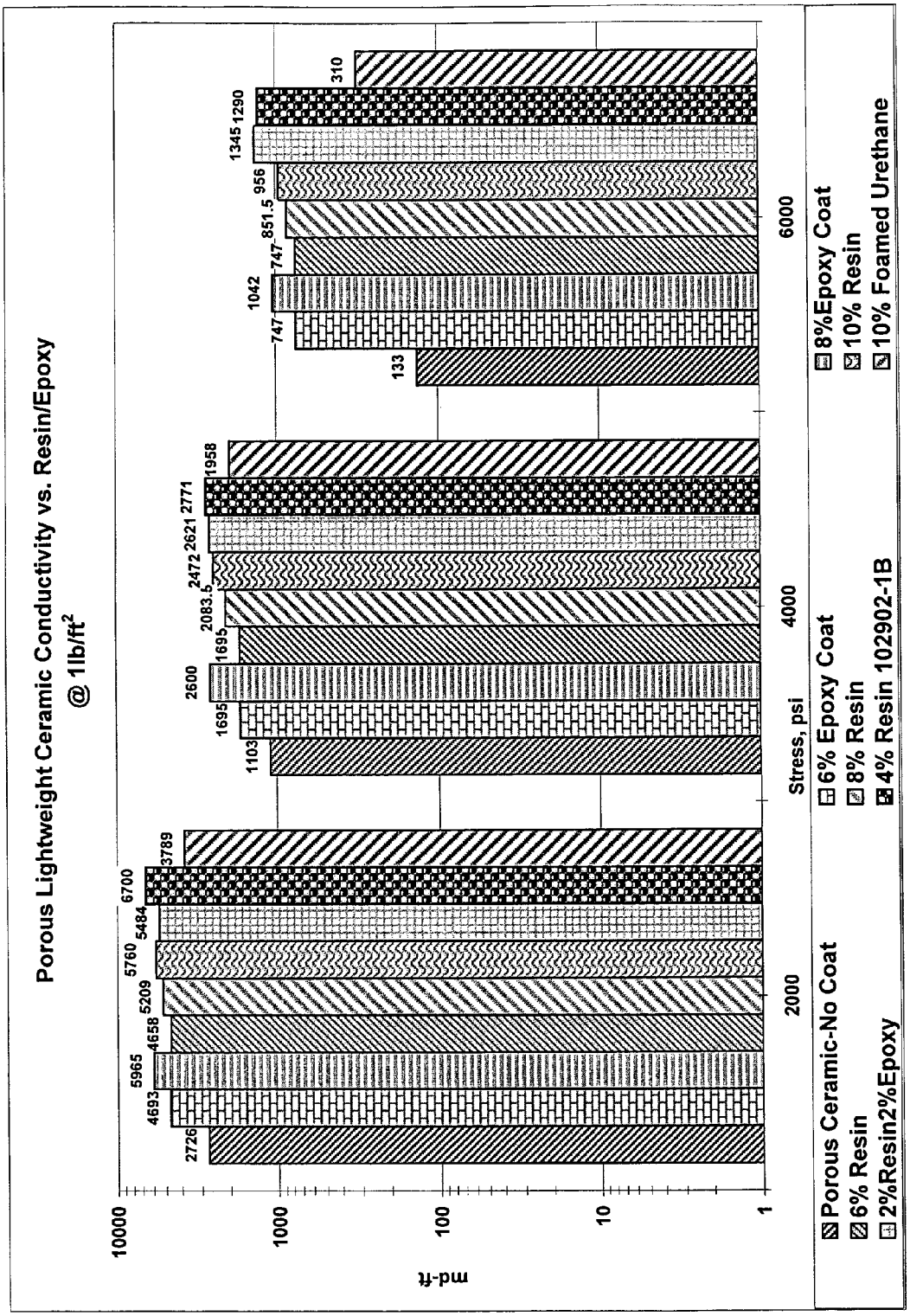
FIG. 6 is a graph depicting conductivity comparison data of Example 2.
Figure 7:
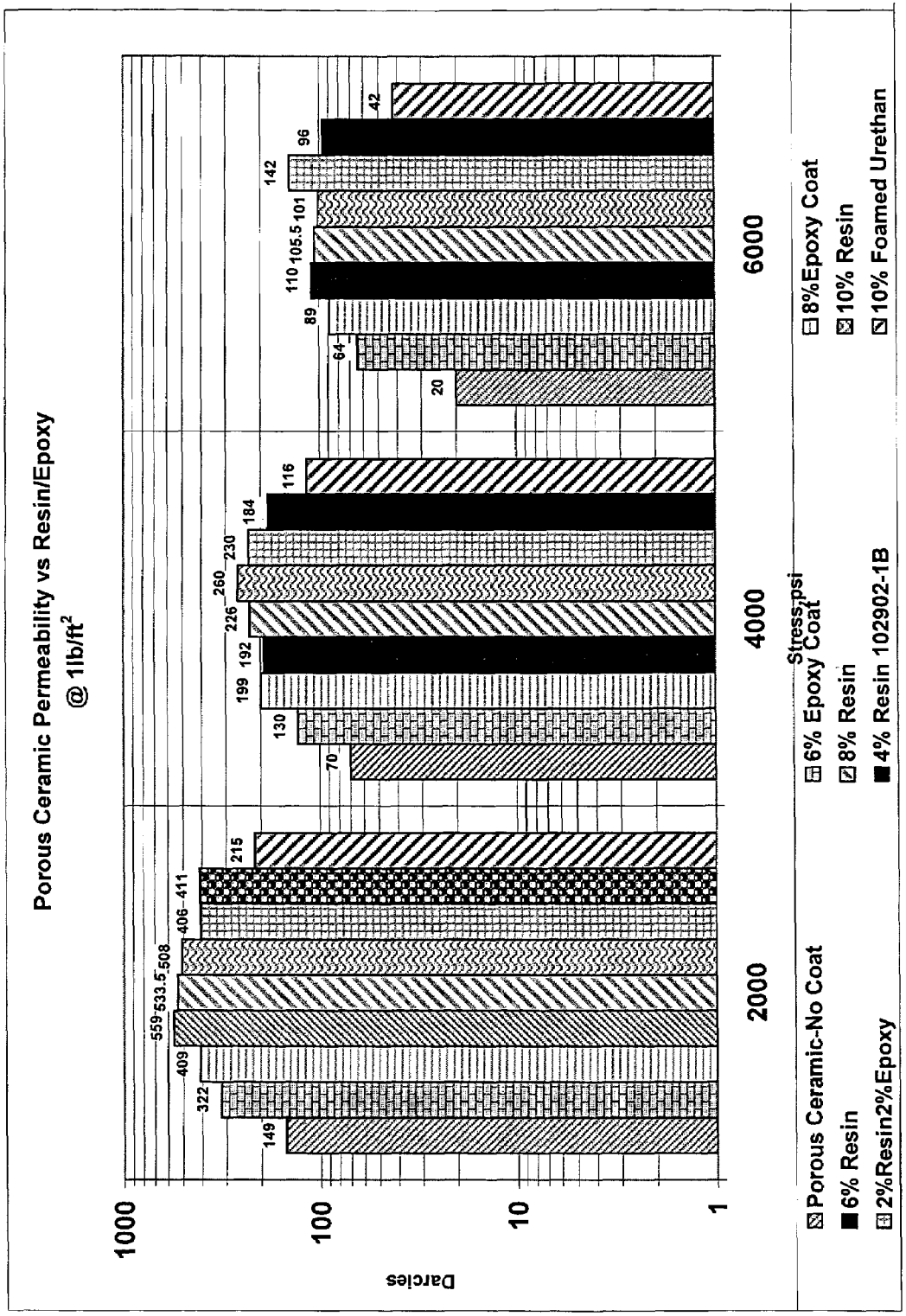
FIG. 7 is a graph depicting permeability comparison data of Example 2.

FIGS. 2 and 5 illustrate the permeability versus closure stress for coated and uncoated ceramic ULW particulates. As shown, resin coating and impregnation of the ULW particle imparts significant strength across the closure range and in particular, enhances the low to mid-range performance of the material. The data represents equal pack widths for all of the proppants with adjustments made for each respective density. Both the coated and uncoated ceramics ULW were tested at 1.4 pounds per square foot (33.2 kg/m$^2$). Each of these tests had nearly identical width measurements for ease of comparison.

Example 2

The porous particulate material employed was from "Carbo Ceramics" having a size of about 20/40 mesh. The particulate material was treated with various penetrating/coating materials corresponding to the same epoxy or phenol formaldehyde materials used above. The treated particulate material was tested alone, with no other particulate material blended in. Comparison materials include Jordan Sand, "Econoprop" proppant from Carbo Ceramics, "Econoflex" (coated Econoprop proppant), Hickory sand (Brady Sand), "PR6000" 2% coated Ottawa sand from BORDEN, and "Carbolite" proppant from Carbo Ceramics.

Conductivity tests were performed according to API RP 61 (1$^{st}$ Revision, Oct. 1, 1989) using an API conductivity cell with Ohio sandstone wafer side inserts. Each particulate material sample was loaded into the cell and closure stress applied to the particulate material using a "DAKE" hydraulic press having a "ROSEMOUNT" differential transducer (#3051C) and controlled by a "CAMILE" controller. Also employed in the testing was a "CONSTAMETRIC 3200" constant rate pump which was used to flow deionized water through each particulate sample.

Table 2 shows the proppant pack Permeability and Conductivity data generated for this example.

TABLE 2

Porous Ceramic Worksheet

| | PC neat | PC-4% Epoxy | PC-6% epoxy | PC-8% epoxy | PC-2% &2% | PC-6% resin | PC-8% resin |
|---|---|---|---|---|---|---|---|
| Bulk Dens | 1.198 | | 1.292 | 1.34 | 1.238 | 1.293 | 1.224 |
| Acid Solubility | 5.7% | | | | | | |
| Porosity | | | 50.2% | 46.9% | | 51.8% | 54.1% |
| Crush | | | | | | | |
| 2000 | | 3.65 | | | | | |
| 3000 | | | | | | | |
| 4000 | | 7.52 | 4.54 | | | | |
| 5000 | | | | | | | |
| 6000 | | 16.88 | 16.36 | | | | |
| 7000 | | 21.00 | | | | | |
| 7500 | | | | | | | |
| 8000 | | | 20.87 | | | | |
| 10000 | | | | | | | |
| Permeability | | | | | | | |
| 2000 | 149 | 425 | 322 | 409 | 406 | 559 | 1193 |
| 3000 | 110 | 331 | 226 | 304 | 318 | 376 | 994 |
| 4000 | 70 | 237 | 130 | 190 | 230 | 192 | 786 |
| 5000 | | 97 | 110 | 131 | 185 | 151 | 671 |
| 6000 | | | 64 | 89 | 142 | 110 | 546 |
| 7000 | | | 48 | 55 | | 78 | 361 |
| 8000 | | | 28 | 44 | | 46 | 175 |

| Conductivity | PC-#1 neat | PC-4% Epoxy | PC-6% epoxy | PC-8% epoxy | PC-2% &2% | PC-6% resin | PC-8% resin |
|---|---|---|---|---|---|---|---|
| 2000 | 2726 | 8436 | 4693 | 5965 | 5484 | 4658 | 13522 |
| 3000 | 1915 | 5152 | 3194 | 4283 | 4053 | 3177 | 10275 |
| 4000 | 1103 | 1868 | 1695 | 2600 | 2621 | 1695 | 7028 |
| 5000 | | 949 | 1356 | 1616 | 1983 | 1221 | 5406 |
| 6000 | | | 747 | 1042 | 1345 | 747 | 3783 |
| 7000 | | | 526 | 604 | | 522 | 2455 |
| 8000 | | | 296 | 463 | | 296 | 1127 |

| | PC 10% resin | 20/40 Jordan | 20/40 Econoprop | 20/40 Econoflex | 20/40 Hickory | 20/40 PR 6000 | 20/40 Carbolite |
|---|---|---|---|---|---|---|---|
| Bulk Dens | 1.32 | 1.6 | 1.6 | 1.5 | 1.6 | 1.54 | 1.6 |
| Acid Solubility | | 1.20% | 1.90% | 0.30% | 0.50% | 0.30% | 1.70% |
| Porosity | | | | | | | |
| Crush | | | | | | | |
| 2000 | | .1 | | | 0.4 | 0.1 | |
| 3000 | | .3 | | | 1.8 | 0.2 | |
| 4000 | | 1.6 | | 0.1 | 9.8 | 0.4 | |
| 5000 | | 2.6 | | | 13.6 | 0.7 | |
| 6000 | | | | 0.1 | | 1.9 | |
| 7000 | | | | | | | |
| 7500 | | | 4.7 | | | 3.1 | 1.5 |
| 8000 | | | | 0.2 | | 4.5 | |
| 10000 | | | 13.3 | 0.5 | | 10.7 | 12.1 |
| Permeability | | | | | | | |
| 2000 | 508 | 228 | 342 | 287 | 224 | 275 | 500 |
| 3000 | 384 | 170 | 319 | 274 | 144 | 241 | 466 |
| 4000 | 260 | 113 | 295 | 262 | 64 | 208 | 433 |
| 5000 | 181 | 80 | 257 | 255 | 42 | 168 | 376 |
| 6000 | 101 | 47 | 220 | 248 | 21 | 127 | 319 |
| 7000 | | 32 | 178 | 225 | 12 | 94 | 252 |
| 8000 | | 18 | 135 | 202 | 4 | 61 | 186 |

| Conductivity | PC-10% resin | 20/40 Jordan | 20/40 Econoprop | 20/40 Econoflex | 20/40 Hickory | 20/40 PR 6000 | 20/40 Carbolite |
|---|---|---|---|---|---|---|---|
| 2000 | 5760 | 2116 | 3423 | 2586 | 2020 | 2550 | 4755 |
| 3000 | 4116 | 1564 | 3132 | 2382 | 1276 | 2201 | 4383 |
| 4000 | 2472 | 1013 | 2842 | 2178 | 532 | 1852 | 4011 |
| 5000 | 1729 | 709 | 2442 | 2036 | 344 | 1468 | 3445 |
| 6000 | 986 | 405 | 2042 | 1895 | 157 | 1085 | 2879 |

TABLE 2-continued

Porous Ceramic Worksheet

| 7000 | 279 | 1621 | 1650 | 94 | 790 | 2255 |
| 8000 | 154 | 1201 | 1405 | 31 | 495 | 1637 |

Data is presented graphically in FIGS. 2-6.

Conductivity is a function of the width times the permeability. Advantageously, as disclosed herein in one embodiment, a selected porous material particulate may be treated with a selected coating and/or penetrating material to produce a relatively lightweight particulate sample that at the same lb/sq ft loading as a conventional sand will occupy a greater width. Even if the pack permeability is the same, the conductivity, and thus the proppant pack producability, will be higher. Thus, as represented by the conductivity data, the benefit of the combination of increased width and the improved permeability may be achieved. Further, as disclosed herein in one embodiment, a selected porous material particulate may be treated with a selected coating and/or penetrating material so that particle strength is maintained to as high a confining (or closure) stress as possible, which is reflected more directly by the permeability data. Thus a certain amount of fracture conductivity at a given stress/temp condition may be maintained without increasing the cost, and/or by offsetting any cost increase with improved value. Even in the event of increased particulate material cost, substantially less particulate material may be employed to achieve a substantially equivalent conductivity due to the lesser mass/unit volume.

Example 3

Using the selected treated material of the Examples above, particles may be produced that are capable for use, such as having sufficient crush resistance for use or do not crush, under conditions of 2000 psi closure stress or greater, alternatively 2500 psi closure stress or greater, alternatively 3000 psi closure stress or greater, alternatively up to at least about 6000 psi closure stress, alternatively up to at least about 7000 psi closure stress, and alternatively at least about 8000 psi closure stress, i.e., almost as resistant to crush as commercial ceramic proppants which are heavier (e.g., commercial ceramic proppant (CarboLite) is about 40% heavier). In another embodiment, particles may be produced that are capable for use (e.g., have sufficient crush resistance for use or do not crush) under conditions of from about 2000 psi closure stress to about 8000 psi closure stress, alternatively from about 2500 psi closure stress to about 8000 psi closure stress, alternatively from about 3000 psi closure stress to about 8000 psi closure stress. However, it will be understood that particles may produced that are capable of use at higher closure stresses than 8000 psi and lower closure stresses than about 2000 psi as well.

FIGS. 8-15 are cross-sectional and surface SEM photographs of various treated and untreated samples of porous ceramic materials from CARBO CERAMICS. Where indicated as "epoxy" or as "resin", the particular coating/penetrating material is either the same epoxy or phenol formaldehyde resin employed and identified in Example 1.

Figure 8:
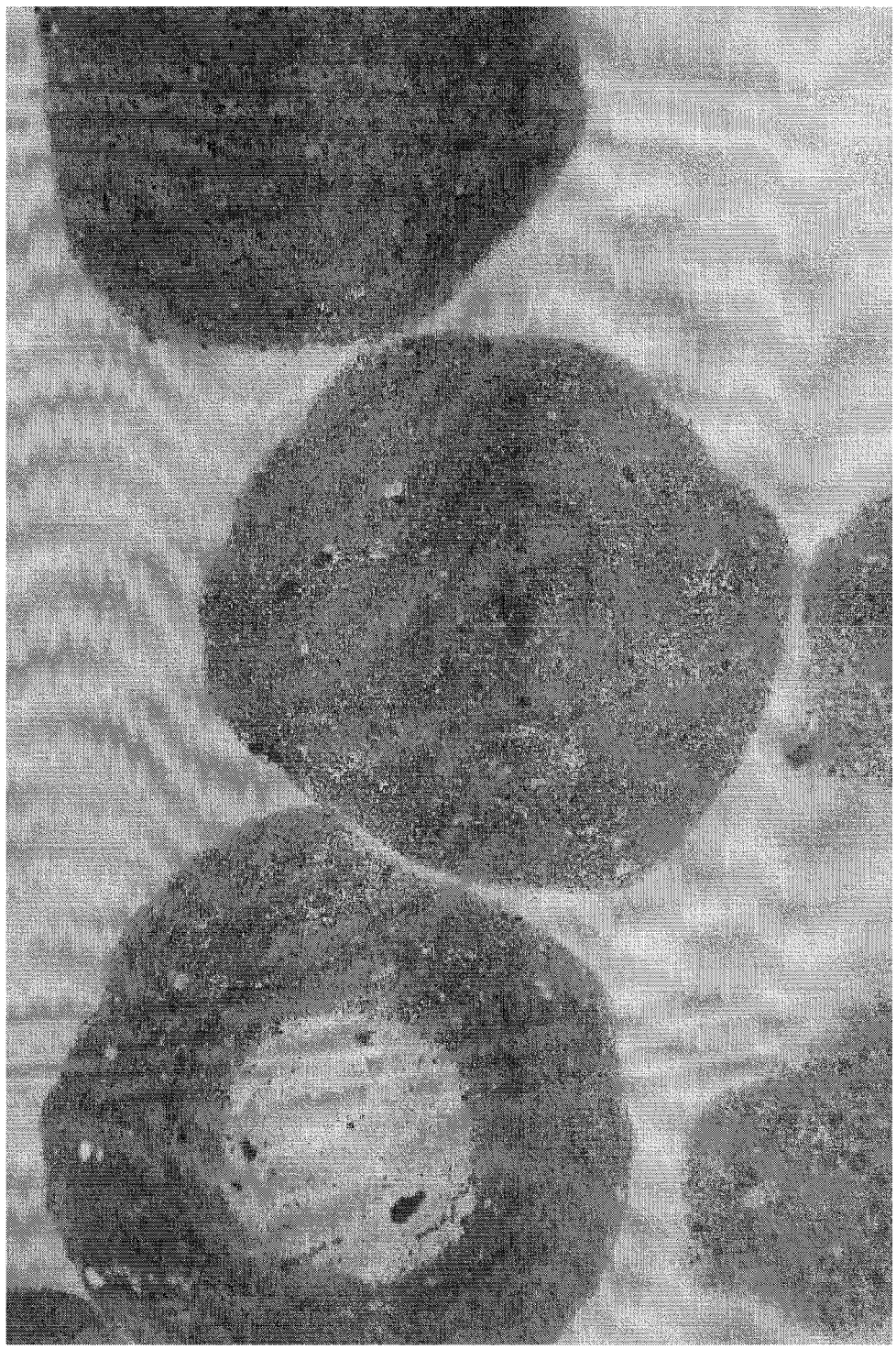
FIG. 8 is a SEM photograph of a porous material particle of Example 3.
Figure 9:
FIG. 9 is a SEM photograph of a porous material particle of Example 3.
Figure 10:
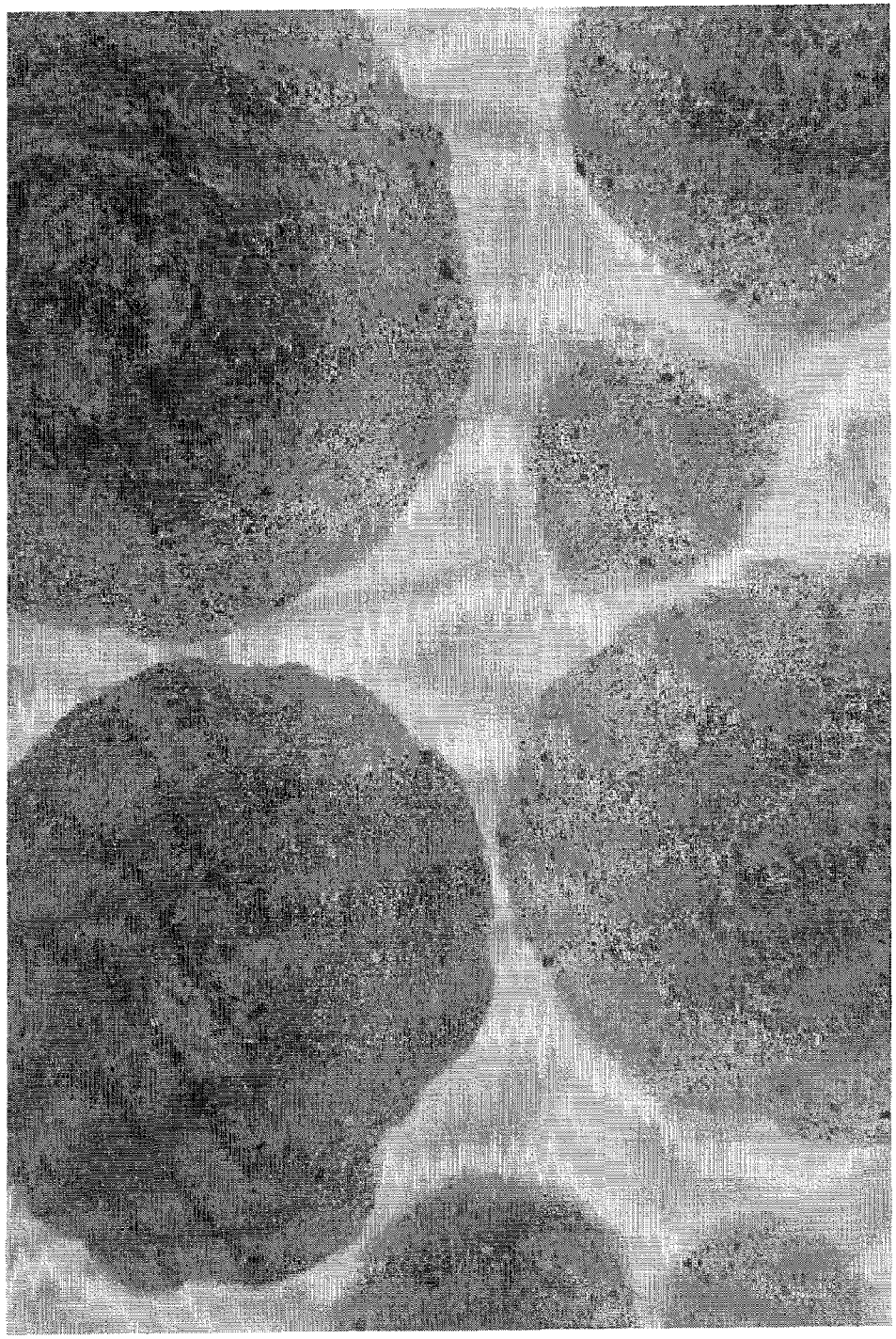
FIG. 10 is a SEM photograph of a porous material particle of Example 3.
Figure 11:
FIG. 11 is a SEM photograph of a porous material particle of Example 3.
Figure 12:
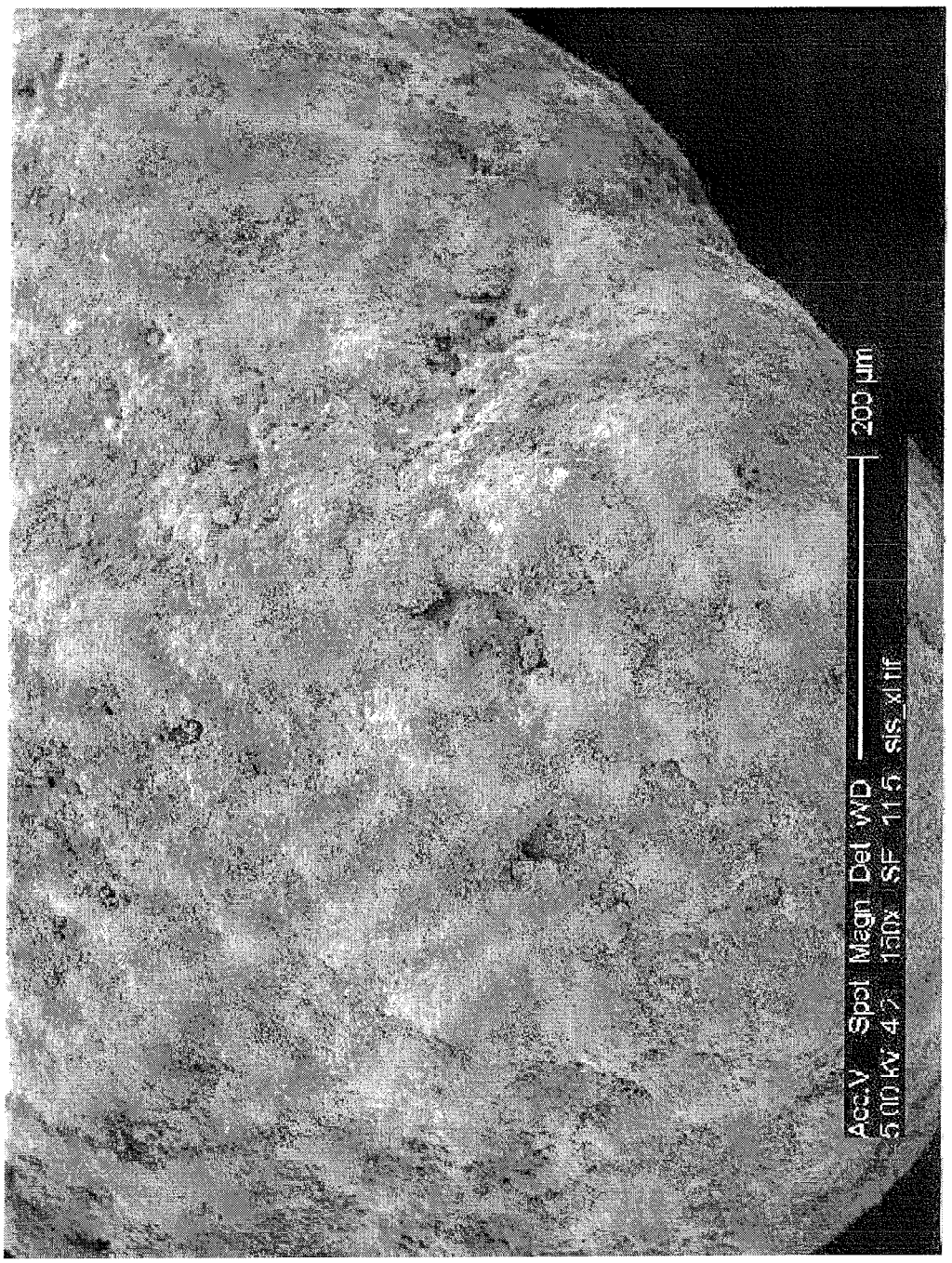
FIG. 12 is a SEM photograph of a porous material particle of Example 3.
Figure 13:
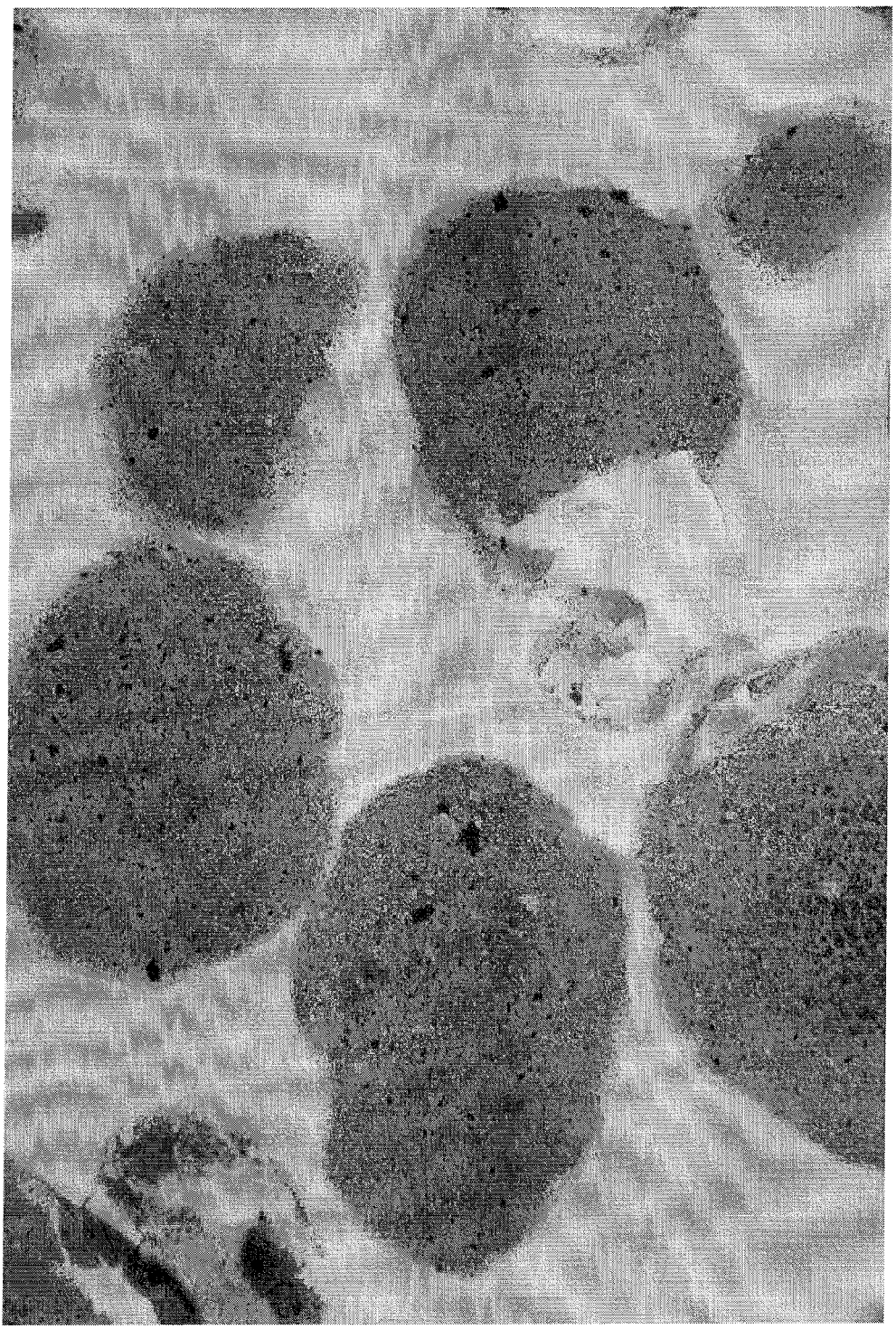
FIG. 13 is a SEM photograph of a porous material particle of Example 3.
Figure 14:
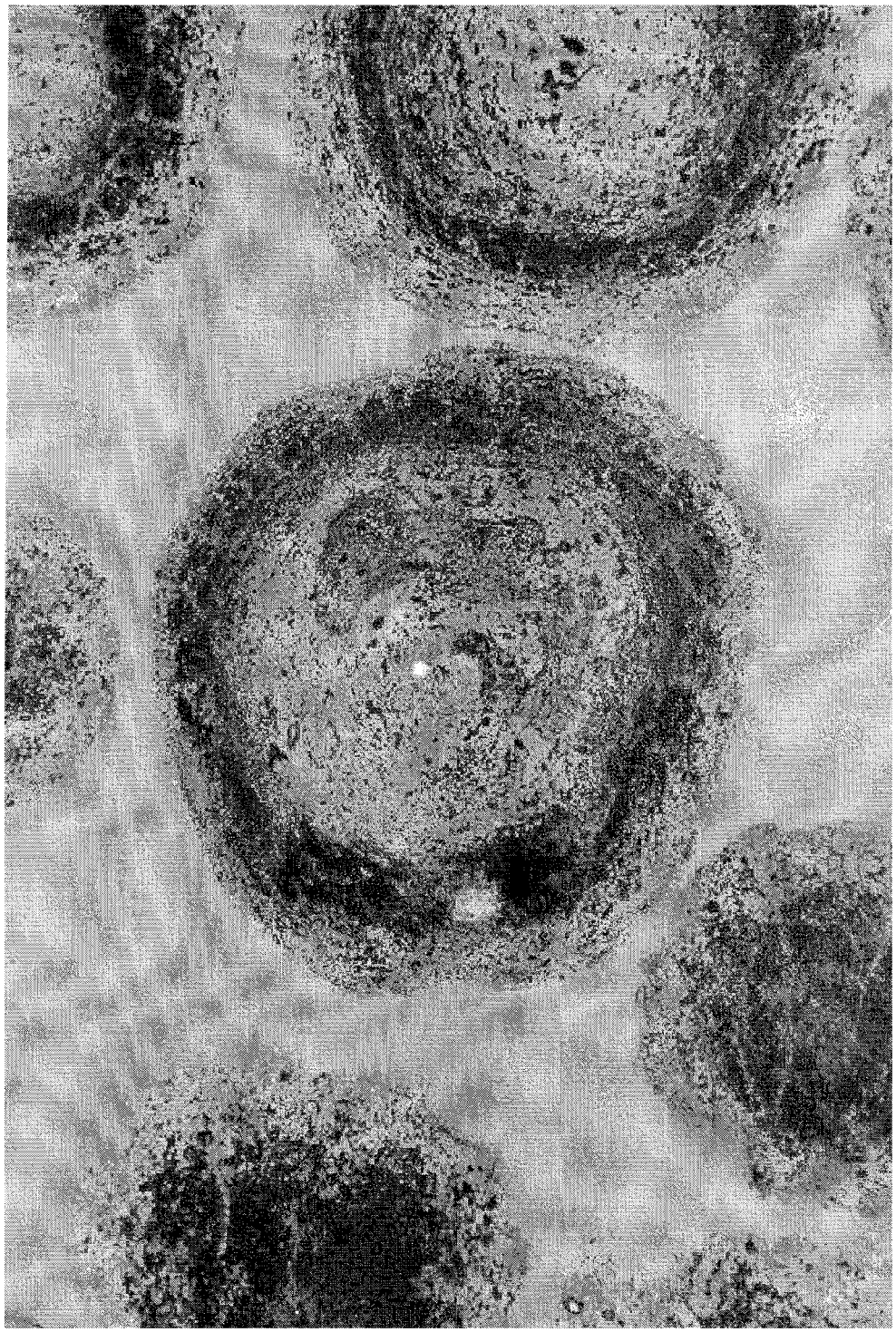
FIG. 14 is a SEM photograph of a porous material particle of Example 3.
Figure 15:
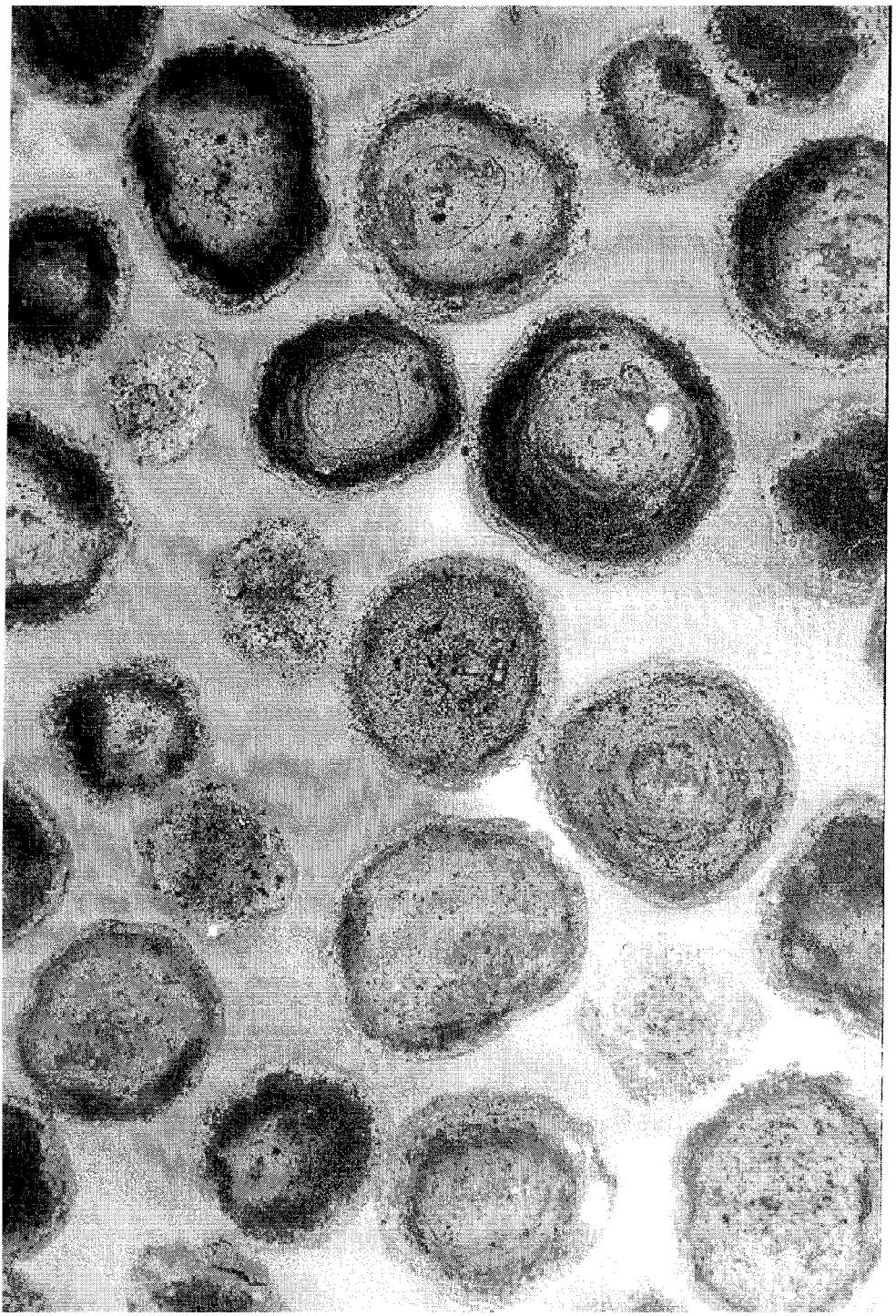
FIG. 15 is a SEM photograph of a porous material particle of Example 3.

FIG. 8 shows particles treated with about 10% by weight of particle resin. FIG. 9 shows particles treated first with 2% by weight epoxy and second with 2% by weight resin. FIG. 10 shows untreated particles. FIG. 11 shows particles treated first with 2% by weight epoxy and second with 2% by weight resin. FIG. 12 shows surface of untreated particle. FIG. 13 shows untreated particles. FIG. 14 shows particles treated with 8% by weight epoxy. FIG. 15 shows particles treated with 6% by weight epoxy.

Example 4

In this example, a selected blend of three different apparent specific gravity well treatment particulates were evaluated for use in a water fracture treatment of a "tight" gas well based on a Canyon Sand gas well. The three different apparent specific gravity particulates were chosen to represent, for example, a selected blend of the following different types of well treatment particulates:

I. 20/40 mesh Ottawa sand having the following properties: apparent specific gravity of 2.65; Vt=17.5 ft/min @ Nre=+/−500 (Typical for water fracs)

II. 20/40 mesh porous ceramic particles coated with 2% resin (described elsewhere herein) having the following properties: apparent specific gravity of 1.70; Vt=9.5 ft/min @ Nre=+/−500 (Typical for water fracs)

III. 20/40 mesh ground or crushed nut shells coated with protective or hardening coating (e.g., "LiteProp" from BJ Services described in U.S. Pat. No. 6,364,018 and U.S. patent application Ser. No. 09/579,146, each incorporated herein by reference) having the following properties: apparent specific gravity of 1.20; Vt=3.9 ft/min @ Nre=+/−500 (Typical for water fracs)

As may be seen from the data above, particulate III weighs about half as much as Particulate I, but settles at a rate less than about ¼ as fast.

Figure 16:
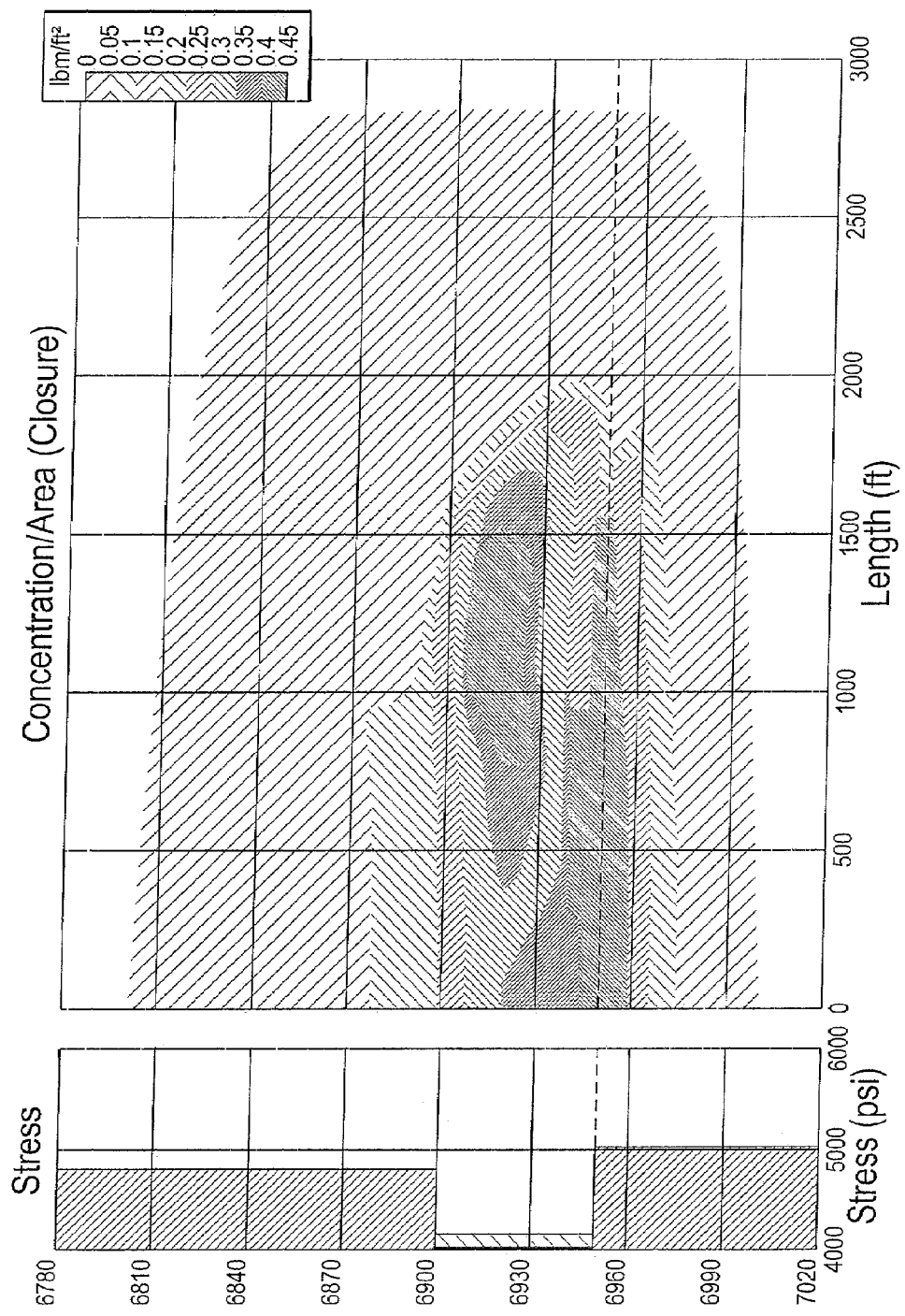
FIG. 16 illustrates proppant distribution for a selected combination of well treatment particulates according to one embodiment of the disclosed compositions and methods described in Example 4.

A well treatment particulate including a selected blend of roughly equal amounts of the above types of particulates (i.e., about ⅓ by weight of above particulate I of the total weight of the blend, about ⅓ by weight of above particulate II of the total weight of the blend, and about ⅓ by weight of above particulate III of the total weight of the blend) was modeled for use in a water fracture treatment of a "tight" gas well using a hydraulic fracture simulation program. FIG. 16 illustrates proppant distribution in the resulting simulated hydraulic fracture created downhole.

Figure 17:
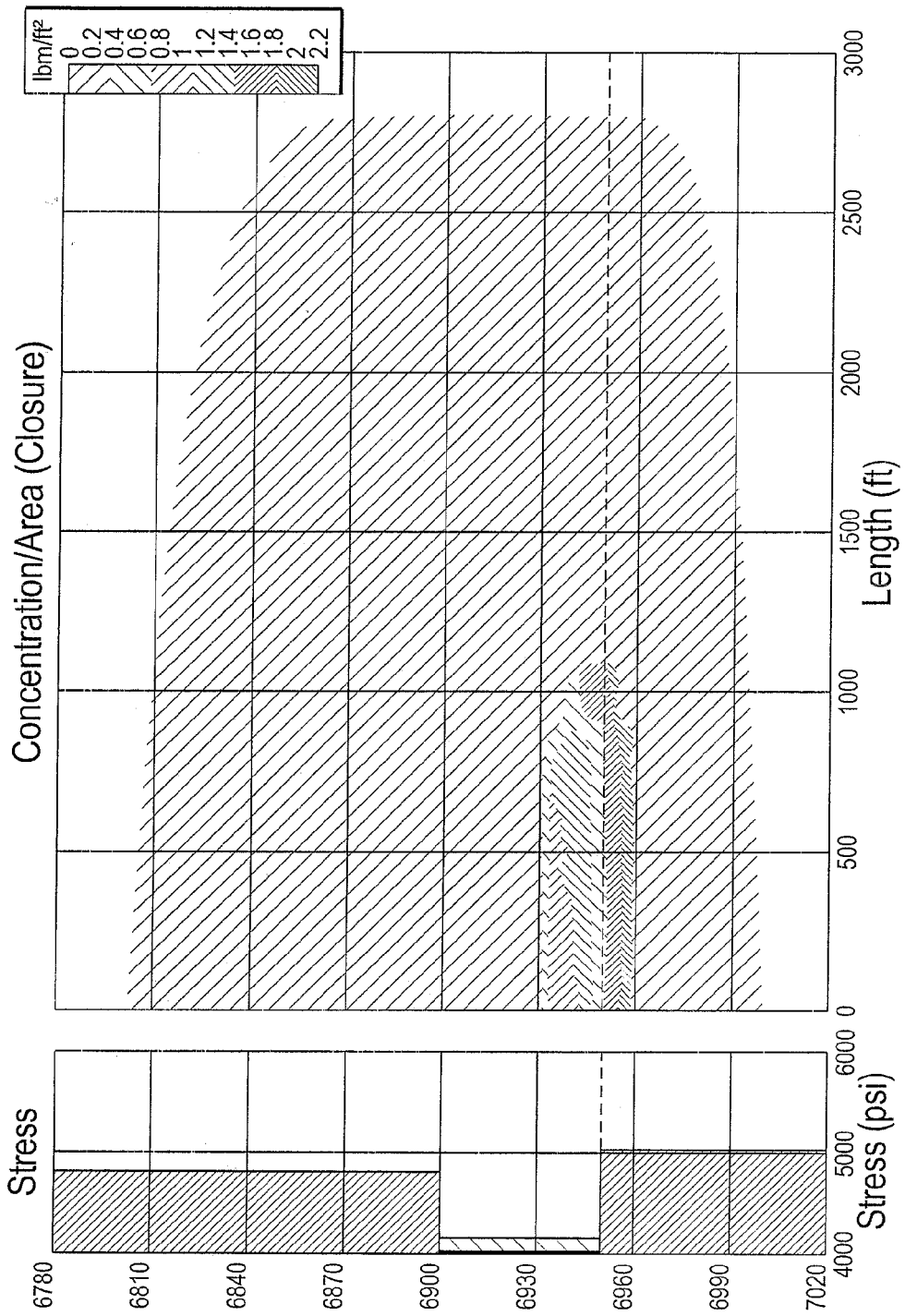
FIG. 17 illustrates comparative proppant distribution data of Example 4 for Ottawa sand alone.

For comparison purpose, a well treatment particulate including only particulate I (Ottawa sand) was modeled for use in a water fracture treatment of the same "tight" gas well similarly modeled using the same pumping schedule (but in this case using 135,000 pounds of Ottawa sand). FIG. 17 illustrates proppant distribution in the resulting simulated hydraulic fracture created downhole.

As may be seen from a comparison of the resulting propped profiles of FIGS. 16 and 17, the well treatment particulate including only particulate I (Ottawa sand) resulted in a proppant distribution that propped the bottom half of the pay out to about 1000' (see FIG. 17), while the well treatment particulate including a selected blend of roughly equal amounts of particulates I, II and III resulted in a synergistic proppant distribution that propped all of the pay out to almost 2000' (see FIG. 16), or approximately four times the propped fracture surface area.

Example 5

The proppant distributions of FIG. 16 and FIG. 17 were next input into a reservoir production simulator ("M-Prod") and gas production separately simulated for each proppant distribution. An assumption was made that the effective conductivity of the proppant distribution of FIG. 16 (i.e., roughly equal amounts of particulates I, II and III) would have only $\frac{1}{10}^{th}$ the effective conductivity of the proppant distribution of FIG. 17 (i.e., particulate I only). The proppant distribution of FIG. 17 (i.e., particulate I only) produced at an initial potential of 707 MCFD with a cumulative production of 595 MMCF over ten years, while the proppant distribution of FIG. 16 (i.e., roughly equal amounts of particulates I, II and III) produced at an initial potential of 920 mcf/day ("MCFD") with a cumulative production of 1312 MMCF over ten years. Thus, the proppant distribution of FIG. 16 (i.e., roughly equal amounts of particulates I, II and III) resulted in the production of twice the reserves from the same well as the proppant distribution of FIG. 17(i.e., particulate I only), despite having only $\frac{1}{10}^{th}$ of assumed conductivity. This shows how the disclosed selected blend of different types of well treatment particulates may be advantageously employed to achieve increased production rates and reserves from relatively tight gas formations by increasing propped fracture lengths, even with reduced effective conductivities.

Although this example illustrates the use of a selected blend of different types and amounts of well treatment particulates in a tight gas well, it will be understood that blends of these and other types of well treatment blends may be selected and employed for other types of wells, including wells productive of liquids as well as gas, and wells having relatively higher formation permeability values. Furthermore, it will be understood that benefits of the disclosed method may be realized using blends of other than three different types of well treatment particulates, for example, using two different types of well treatment particulates or more than three different types of well treatment particulates (e.g., as many as four, five, six, seven, eight, nine and more different types of well treatment particulates) having varying characteristics.

Example 6

ULW-1.75 corresponds to 2/2 discussed above in Example 1 and can be characterized as a porous ceramic particle with the roundness and sphericity common to ceramic proppants. The porosity averages 50%, yielding a bulk density of 1.10 to 1.15 g/cm³. Median-sized 20/40 particles of the ULW-1.75 and Ottawa sand were used. The 20/40 Ottawa sand has an average bulk density of 1.62 g/cm with a specific gravity of 2.65. The ULW-1.75 has a bulk density of 1.05 to 1.10.

Static particle settling evaluations were conducted in fresh water to determine the differences in settling rate between the conventional proppant and the ULW particles. Median sized 20/40 particles of each proppant were used for the evaluations. Stokes Law calculations giving the fall velocity in ft/minute are presented in Table 3 and were calculated as:

$$V = 1.15 \times 10^3 (d_{prop}^2 / \mu_{fluid})(Sp.Gr._{prop} - Sp.Gr._{fluid})$$

where velocity is in ft/min., diameter d is the average particle diameter and, μ is fluid viscosity in cps.

TABLE 3

Static Settling Rates for Proppants as Derived by Stoke's Law

| 20/40 Proppant | Sp. Gr. | Settling Velocity ft/minute |
|---|---|---|
| Ottawa sand | 2.65 | 16.6 |
| ULW-1.75 | 1.75 | 11.2 |

Large-scale slot flow tests were conducted to characterize the dynamic settling rates of the ultra-lightweight proppant. Proppant transport characteristics were studied at ambient temperature through a glass slot. The transparent slot is a 22-inch high, 16-ft long and 0.5-inch wide parallel plate device. One thousand gallons of test fluid was prepared and the fluid rheology was measured using a standard Fann 35 viscometer. Fluid was then transferred to a 200-gallon capacity ribbon blender and pumped through the test loop to fill the transparent slot model. Once the slot was filled with the test fluid, proppant was added to the blender to prepare a slurry of the desired concentration. The slickwater fluid used in the test exhibited an average viscosity of 5 to 7 cps throughout the series of tests.

The shear rate in the slot is given by the equation:

$$\gamma = [\sec^{-1}] = \frac{1.925 q[\text{gpm}]}{(w[\text{in.}])^2 (H[\text{ft}])}$$

where q is the rate in gallons per minute, w is width in inches and H is height in feet. Fluid velocity through this slot model is given by:

$$v\,[\text{m/sec}] = \frac{0.00815 q[\text{gpm}]}{(w[\text{in.}])^2 (H[\text{ft}])}$$

The proppant transport behavior of each test slurry was observed through the slot at various flow rates. During these tests, the proppant distribution was continually recorded with video cameras as well as manually by observation. All bed height measurements for this work were taken close to the discharge end of the slot flow cell.

Ottawa sand slurried in slickwater was observed to begin settling upon entrance to the slot even at the maximum fluid pump rate. Within 12 minutes at 90 gpm (378 sec-1 shear rate), the bed height was 15 inches, 68% of the total height of the 22 in. slot. Table 4 below shows the results in tabular form. Only at shear rates in excess of 1000 sec-1 was the dynamic Ottawa Sand proppant fall rate mitigated in the slickwater test fluid. As flow rates were lowered to 30 gpm, the Ottawa proppant bed reached its maximum bed height of 19.5 inches or 91.25% of the slot height. Above the proppant bed, the shear rate reached 1,414 sec-1, at which point additional settling did not occur. As the rate increased from 30 to 40 gpm (1,919 sec-1), the bed height was actually reduced.

TABLE 4

| Time, minute | Fluid Rate Gpm | Prop Bed Height (ft) | Slot Shear Sec-1 | Above bed, sec-1 |
|---|---|---|---|---|
| 0 | 90 | 0 | 378 | 378 |
| 1 | 90 | 0.25 | 383 | 443 |
| 12 | 90 | 1.25 | 381 | 1201 |
| 14 | 60 | 1.27 | 252 | 825 |

TABLE 4-continued

| Time, minute | Fluid Rate Gpm | Prop Bed Height (ft) | Slot Shear Sec-1 | Above bed, sec-1 |
|---|---|---|---|---|
| 18 | 60 | 1.38 | 252 | 825 |
| 19 | 40 | 1.39 | 168 | 677 |
| 28 | 40 | 1.54 | 170 | 1076 |
| 30 | 30 | 1.58 | 116 | 858 |
| 42 | 30 | 1.67 | 171 | 1414 |
| 43 | 40 | 1.67 | 171 | 1919 |
| 45 | 40 | 1.52 | 169 | 1070 |

The ULW-1.75 test was initiated at 90 gpm. ULW-1.75 was observed to be subject to some settling at 90 gpm, with the bed height growing to 4 inches. The fluid rate was lowered to 80 gpm and bed height grew to 6 inches. As the rates were reduced incrementally down to 30 gpm, the ULW-1.75 bed was observed to grow with reduced rate to 12 inches. The rate was lowered further to 5 gpm and the bed height grew to 19 inches or 86% of the total slot height. As observed in previous tests, as the rate is increased incrementally, bed height decreases due to erosion and fluidization of the bed. The ULW-1.75 results are presented in Table 5.

TABLE 5

| Time, minute | Fluid Rate Gpm | Prop Bed Height | Slot Shear Sec-1 | Above bed, sec-1 |
|---|---|---|---|---|
| 0 | 90 | 0.0 | 378 | 378 |
| 7 | 90 | 0.33 | 378 | 463 |
| 8 | 80 | 0.38 | 337 | 423 |
| 11 | 80 | 0.54 | 337 | 478 |
| 12 | 70 | 0.58 | 295 | 432 |
| 15 | 60 | 0.71 | 252 | 412 |
| 17 | 60 | 0.79 | 252 | 445 |
| 18 | 50 | 0.83 | 210 | 386 |
| 20 | 50.4 | 0.92 | 212 | 425 |
| 22 | 39 | 0.96 | 164 | 345 |
| 23 | 30 | 1 | 126 | 278 |
| 28 | 31 | 1.29 | 130 | 443 |
| 29 | 20 | 1.33 | 81 | 299 |
| 33 | 8 | 1.44 | 34 | 159 |
| 34 | 5.1 | 1.46 | 21 | 106 |
| 35 | 20 | 1.54 | 84 | 534 |
| 37 | 20.5 | 1.58 | 86 | 640 |
| 38 | 40.4 | 1.52 | 170 | 1006 |
| 40 | 50.6 | 1.46 | 213 | 1048 |
| 45 | 60.2 | 1.33 | 253 | 933 |

Both of the tested materials settle progressively more as the velocity decreases. Due to the decreased density, the ULW is more easily placed back in flow as the rate is increased. The reduced density materials require less shear increase to fluidize the proppant bed. Ottawa sand was observed to require in excess of 1,500 sec-I to transport the proppant in slickwater and almost 2,000 sec-1 of shear to begin to fluidize the proppant bed. The ULW-1.75 transporting at shear rates of 500 sec-1 and fluid shear rates of 800 sec-1 were needed to fluidize the proppant bed.

The data clearly show the advantage of lower density particles in relation to dynamic sand fall rates. Heavier proppants require significant fluid viscosity, elevated fluid density, and/or high slurry velocity for effective proppant transport.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention.

From the foregoing, it will be observed that numerous variations and modifications may be effected without departing from the true spirit and scope of the novel concepts of the invention.

What is claimed is:

1. A method for treating a well penetrating a subterranean formation under conditions of from 2,500 to 10,000 psi closure stress, comprising introducing into the well a proppant of a selectively configured porous particulate material, the selectively configured porous particulate material being a porous particulate material manufactured with a glazing material or treated with a penetrating layer, coating layer or glazing material, wherein the selectively configured porous particulate material exhibits crush resistance under the closure stress conditions and further wherein the strength of the selectively configured porous particulate material is greater than the strength of the porous particulate material.

2. The method of claim 1, wherein the porous particulate material is a porous ceramic.

3. The method of claim 2, wherein the porous ceramic is a relatively lightweight and/or substantially neutrally buoyant particle.

4. The method of claim 2, wherein the selectively configured porous particulate material is a porous ceramic coated or penetrated with a liquid resin, plastic, cement, sealant, or binder.

5. The method of claim 4, wherein the penetrating material and/or coating of the selectively configured porous particulate material is capable of trapping or encapsulating a fluid having an apparent specific gravity less than the apparent specific gravity of the matrix of the porous ceramic.

6. The method of claim 5, wherein the fluid is a gas.

7. The method of claim 4, wherein the coating layer or penetrating material is an ethyl carbamate-based resin.

8. The method of claim 2, wherein the selectively configured porous particulate material is a porous ceramic coated or penetrated with a phenol, phenol formaldehyde, melamine formaldehyde, urethane, or epoxy resin.

9. The method of claim 2, wherein the selectively configured porous particulate material is a porous ceramic penetrated with nylon, polyethylene or polystyrene or a combination thereof.

10. The method of claim 2, wherein the selectively configured porous particulate material comprises a multitude of coated porous ceramic particulates bonded together and coated or penetrated with a curable resin.

11. The method of claim 2, wherein the porous ceramic has a maximum length-based aspect ratio of equal to or less than about 5.

12. The method of claim 1, wherein the porous particulate material has a porosity and permeability such that a fluid may be drawn at least partially into its porous matrix by capillary action.

13. The method of claim 1, wherein the porous particulate material has a porosity and permeability such that a penetrating material may be drawn at least partially into its porous matrix using a vacuum and/or may be forced at least partially into its porous matrix under pressure.

14. The method of claim 1 wherein the well is a deviated well having an angle with respect to the vertical of between about 30 degrees and about 90 degrees.

15. The method of claim 1, wherein the glazing material, penetrating layer or coating layer is non-porous.

16. The method of claim 1 wherein the apparent specific gravity of the selectively configured porous particulate material is less than the apparent specific gravity of the porous particulate material.

17. The method of claim 1, wherein the porous particulate material is a polyolefin.

18. The method of claim 1 wherein the selectively configured porous particulate material has an apparent density from about 1.1 g/cm$^3$ about 2.6 g/cm$^3$ and a bulk apparent density from about 1.03 g/cm$^3$ to about 1.4 g/cm$^3$.

19. The method of claim 1 wherein the size of the selectively configured porous particulate material is between from about 200 mesh to about 8 mesh.

20. The method of claim 1 wherein the selectively configured porous particulate material has a coating layer or penetrating material in an amount of from about 0.5 to about 10% by weight of total weight.

21. The method of claim 20, wherein the thickness of the coating layer of the selectively configured porous particulate material is from about 1 to about 5 microns.

22. The method of claim 1 wherein the selectively configured porous particulate material is introduced or pumped into the well as neutrally buoyant particles in a carrier fluid.

23. The method of claim 22, wherein the carrier fluid is a completion or workover brine.

24. The method of claim 22, wherein the carrier fluid is salt water, fresh water, a liquid hydrocarbon, or a gas or a mixture thereof.

25. The method of claim 24, wherein the gas is nitrogen or carbon dioxide.

26. The method of claim 22, wherein the fluid pumped into the well further comprises a gelling agent, crosslinking agent, gel breaker, surfactant, foaming agent, demulsifier, buffer, clay stabilizer, acid or a mixture thereof.

27. The method of claim 1 wherein the permeability of the selectively configured porous particulate material is less than the permeability of the porous particulate material.

28. The method of claim 1 wherein the selectively configured porous particulate material is introduced into the well with a liquefied gas or foamed gas carrier fluid or a mixture thereof.

29. The method of claim 28, wherein the liquefied gas or foamed gas carrier fluid is a liquid carbon dioxide based system.

30. The method of claim 28, wherein the liquefied gas or foamed gas carrier fluid is nitrogen.

31. The method of claim 28, wherein the liquefied gas or foamed gas carrier fluid is a mixture of liquid carbon dioxide and nitrogen.

32. The method of claim 1 wherein the selectively configured porous particulate material is a porous particulate material having a glazed surface.

33. The method of claim 32, wherein the glazed surface of the porous particulate material enhances the ease of multiphase fluid flow through a particulate pack.

34. The method of claim 32, wherein the glazed surface of the porous particulate material enhances the ease of high rate turbulent gas flow through a particulate pack.

35. The method of claim 1, wherein the apparent specific gravity of the porous particulate material is less than or equal to 1.75.

36. The method of claim 35, wherein the apparent specific gravity of the porous particulate material is less than or equal to 1.25.

37. The method of claim 1, wherein the closure stress conditions are from 3,000 to 10,000 psi.

38. The method of claim 1, wherein the selectively configured porous particulate material is introduced into the well at concentrations sufficient to achieve apartial monolayer fracture.

39. The method of claim 1, wherein the selectively configured porous particulate material is introduced into the well as a slick water fracturing fluid.

40. A method for treating a well penetrating a subterranean formation, comprising introducing into the well a proppant of a selectively configured porous particulate material in a non-gelled carrier fluid, the selectively configured porous particulate material comprising a composite of a porous particulate material and a non-porous glazing material or a porous particulate material treated with a penetrating material, coating layer or glazing layer such that the porous particulate material of the selectively configured porous particulate material is at least partially filled with air or a gas.

41. The method of claim 40, wherein the selectively configured porous particulate material exhibits crush resistance under conditions from about 250 to about 8,000 psi closure stress.

42. The method of claim 40, wherein the non-gelled carrier fluid contains a friction reducer.

43. The method of claim 40, wherein the apparent specific gravity of the selectively configured porous particulate material is less than the apparent specific gravity of the porous particulate material.

44. The method of claim 40, wherein the well is horizontal or is a deviated well having an angle with respect to the vertical of between about 0 degrees and about 90 degrees.

45. The method of claim 40, wherein the selectively configured porous particulate material comprises a porous particulate material coated or penetrated with a liquid resin, plastic, cement, sealant, or binder.

46. The method of claim 45, wherein the liquid resin, plastic, cement, sealer, or binder is selected from the group consisting of a phenol, phenol formaldehyde, melamine formaldehyde, urethane, epoxy resin, nylon, polyethylene or polystyrene or a combination thereof.

47. The method of claim 40, wherein the porous particulate material is introduced into the well with a liquefied gas or foamed gas carrier fluid or a mixture thereof.

48. The method of claim 47, wherein the liquefied gas or foamed gas carrier fluid is a liquid carbon dioxide based system.

49. The method of claim 48, wherein the liquefied gas or foamed gas carrier fluid is a mixture of liquid carbon dioxide and nitrogen.

50. The method of claim 47, wherein the liquefied gas or foamed gas carrier fluid is nitrogen.

51. The method of claim 47, wherein the liquefied gas or foamed gas carrier fluid is a foam of nitrogen in liquid carbon dioxide.

52. The method of claim 40, wherein the selectively configured porous particulate material is introduced into the well at concentrations sufficient to achieve a partial monolayer fracture.

53. The method of claim 40, wherein the strength of the selectively configured porous particulate material is greater than the strength of the porous particulate material.

54. The method of claim 40, wherein the porous particulate material is a porous ceramic.

55. The method of claim 54, wherein the porous ceramic is a substantially neutrally buoyant particle and is introduced or pumped into the well as a suspension in a storage fluid wherein the density of the storage fluid and porous ceramic is of near orsubstantially equal density.

56. The method of claim 40, wherein the selectively configured porous particulate material is introduced into the well as a slick water fracturing fluid.

57. The method of claim 40, wherein the selectively configured porous particulate material has an apparent density from about 1.1 g/cm$^3$ about 2.6 g/cm$^3$ and a bulk apparent density from about 1.03 g/cm$^3$ to about 1.4 g/cm$^3$.

58. The method of claim 40, wherein the permeability of the selectively configured porous particulate material is less than the permeability of the porous particulate material.

59. The method of claim 40, wherein the selectively configured porous particulate material is a porous particulate material having a glazed surface.

60. The method of claim 59, wherein the glazed surface of the selectively configured porous particulate material enhances the ease of high rate turbulent gas flow through a particulate pack.

61. The method of claim 40, wherein the apparent specific gravity of the porous particulate material is less than or equal to 1.75.

62. The method of claim 40, wherein the selectively configured porous particulate material is introduced into the well as a slick water fracturing fluid.

63. A method for treating a well penetrating a subterranean formation, comprising introducing into the well a selectively configured porous particulate material, wherein the selectively configured porous particulate material is a porous particulate material treated with a penetrating or coating layer wherein the penetrating or coating layer penetrates the porous particulate and encapsulates air within the pores of the particulate.

64. The method of claim 63, wherein the selectively configured porous particulate material is suspended in a carrier fluid.

65. The method of claim 63, wherein the selectively configured porous particulate material has a coating layer or penetrating material which is a liquid having an apparent specific gravity less than the apparent specific gravity of the matrix of the porous particulate material.

66. The method of claim 63, wherein the selectively configured porous particulate material, when introduced into the well, forms a fluid-permeable gravel pack in an annular area defined between the exterior of a screen assembly and the interior of the weilbore.

67. The method of claim 63, wherein the apparent specific gravity of the selectively configured porous particulate material is less than the apparent specific gravity of the porous particulate material.

68. The method of claim 63, wherein the porous particulate material is a relatively lightweight and/or substantially neutrally buoyant particle.

69. The method of claim 63, wherein the selectively configured porous particulate material exhibits crush resistance under conditions from 2,500 psi to 10,000 psi closure stress.

70. The method of claim 63, wherein the selectively configured porous particulate material is a porous particulate coated or penetrated with a liquid resin, plastic, cement, sealant, or binder.

71. The method of claim 70, wherein the liquid resin is a curable resin and further wherein the selectively configured porous particulate material comprises a multitude of coated particulates bonded together.

72. The method of claim 63, wherein the selectively configured porous particulate material is introduced into the well at concentrations sufficient to achieve a partial monolayer fracture.

73. The method of claim 63, wherein the coating layer or penetrating layer is present in the selectively configured porous particulate material in an amount of from about 0.5 to about 10% by weight of total weight.

74. The method of claim 63, wherein the apparent specific gravity of the porous particulate material is less than or equal to 1.75.

75. The method of claim 63, wherein the porous particulate material is a porous ceramic.

76. A method of fracturing a hydrocarbon-bearing formation comprising introducing into the formation a selectively configured porous particulate material in a transport fluid, wherein the selectively configured porous particulate material comprises a composite of a porous organic polymeric material treated with a penetrating and/or coating material and further wherein the penetrating and/or coating material penetrates the organic polymeric material to effectively encapsulate air within the porosity of the organic polymeric material.

77. The method of claim 76 wherein the porosity and permeability of the porous organic polymeric material is such that a fluid may be drawn at least partially into its porous matrix by capillary action.

78. The method of claim 76, wherein the selectively configured porous particulate material is introduced into the well at concentrations sufficient to achieve a partial monolayer fracture.

79. The method of claim 76, wherein the porous organic polymeric material is a relatively lightweight and/or substantially neutrally buoyant particle.

80. The method of claim 76, wherein the porous organic polymeric material is an ultra-lightweight organic polymeric material.

81. The method of claim 76, wherein the selectively configured porous particulate material, when introduced into the well, is suspended in a transport fluid.

82. The method of claim 81, wherein the transport fluid is salt water, fresh water, a liquid hydrocarbon, or a gas or a mixture thereof.

83. The method of claim 81, wherein the transport fluid further comprises a gelling agent, crosslinking agent, gel breaker, surfactant, foaming agent, demulsifier, buffer, clay stabilizer, acid or a mixture thereof.

84. The method of claim 76, wherein the apparent density or apparent specific gravity of the selectively configured porous particulate material is less than the apparent density or apparent specific gravity of the porous organic polymeric material.

85. The method of claim 76, wherein the selectively configured porous particulate material is introduced into the well as a slick water fracturing fluid.

* * * * *

UNITED STATES PATENT AND TRADEMARK OFFICE
CERTIFICATE OF CORRECTION

| | | |
|---|---|---|
| PATENT NO. | : 7,426,961 B2 | Page 1 of 1 |
| APPLICATION NO. | : 10/653521 | |
| DATED | : September 23, 2008 | |
| INVENTOR(S) | : Stephenson et al. | |

It is certified that error appears in the above-identified patent and that said Letters Patent is hereby corrected as shown below:

Column 29, line 5, replace "about 2.6" with "to about 2.6"
Column 29, line 66, replace "apartial" with "a partial"
Column 30, line 64, replace "orsubstantially" with "or substantially"
Column 31, line 3, replace "about 2.6" with "to about 2.6"
Column 31, line 41, replace "weilbore" with "wellbore"

Signed and Sealed this

Sixth Day of January, 2009

JON W. DUDAS
*Director of the United States Patent and Trademark Office*